US012655723B2

(12) United States Patent
Chen et al.

(10) Patent No.: US 12,655,723 B2
(45) Date of Patent: Jun. 16, 2026

(54) OPTIMIZING CO₂ GEOSEQUESTRATION WITH RESPONSIVE TRACERS

(71) Applicant: ARAMCO SERVICES COMPANY, Houston, TX (US)

(72) Inventors: Hsieh Chen, Cambridge, MA (US); Bora Yoon, Watertown, MA (US); Martin E. Poitzsch, Northumberland, NH (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/658,242

(22) Filed: May 8, 2024

(65) Prior Publication Data

US 2025/0347195 A1      Nov. 13, 2025

(51) Int. Cl.
*E21B 41/00* (2006.01)
*E21B 47/11* (2012.01)
(Continued)

(52) U.S. Cl.
CPC .......... *E21B 41/0064* (2013.01); *E21B 47/11* (2020.05); *E21B 49/00* (2013.01); *G01V 9/00* (2013.01); *G01V 20/00* (2024.01)

(58) Field of Classification Search
CPC .......... E21B 47/11; E21B 49/00; E21B 49/08; E21B 47/00; E21B 2200/20
See application file for complete search history.

(56) References Cited

U.S. PATENT DOCUMENTS 3,590,923 A      7/1971   Cooke, Jr.
8,603,827 B2   12/2013   Zahlsen et al.
(Continued)

FOREIGN PATENT DOCUMENTS

KR          101996182 B1      7/2019
WO      2010/132395 A1      11/2010
(Continued)

OTHER PUBLICATIONS

Dawson et al., "Inaccessible Pore Volume in Polymer Flooding," Society of Petroleum Engineers, SPE 3522-PA, 1972, 5 pages.
(Continued)

*Primary Examiner* — Zakiya W Bates
(74) *Attorney, Agent, or Firm* — Osha Bergman Watanabe & Burton LLP

(57) ABSTRACT

A method for sequestering carbon dioxide (CO₂) in a formation includes providing an injection well extending into the formation, injecting a tracer into the injection well to the formation, collecting the tracer at a surface of the formation, obtaining tracer data from the collected tracer, determining, by a computer system, a geological property with the obtained tracer data and a history matching algorithm, and optimizing a CO₂ injection rate for CO₂ sequestration in the formation based on the determined geological property. A system for CO₂ sequestration and determining geological properties of a formation includes an injection well extending from a surface into a formation, an injection system in fluid communication with the injection well, a production well, a tracer detection system located at the surface, and a control system coupled to the tracer detection system and configured to sequester CO₂ in the formation.

15 Claims, 14 Drawing Sheets

(51) Int. Cl.
| | | |
|---|---|---|
| *E21B 49/00* | (2006.01) | |
| *G01V 9/00* | (2006.01) | |
| *G01V 20/00* | (2024.01) | |

(56) References Cited

U.S. PATENT DOCUMENTS

| | | |
|---|---|---|
| 10,858,931 B2 | 12/2020 | Chen et al. |
| 11,230,919 B2 | 1/2022 | Ow et al. |
| 11,261,300 B2 | 3/2022 | Kim et al. |
| 2017/0067323 A1 | 3/2017 | Katterbauer et al. |
| 2019/0218907 A1* | 7/2019 | Ow .......................... E21B 47/11 |
| 2021/0025858 A1 | 1/2021 | Ow et al. |

FOREIGN PATENT DOCUMENTS

| | | | |
|---|---|---|---|
| WO | 2017136641 A1 | 8/2017 | |
| WO | WO-2024062130 A1 * | 3/2024 | ......... E21B 41/0064 |

OTHER PUBLICATIONS

He et al., "Brine-Soluble Zwitterionic Copolymers with Tunable Adsorption on Rocks," Applied Materials & Interfaces, 2020, 7 pages.

Ow et al., "First Deployment of a Novel Advanced Tracers System for Improved Waterflood Recovery Optimization," Society of Petroleum Engineers, SPE-192598-MS, 2018, 10 pages.

Feitosa-Felizzola, Juliana et al., "Adsorption and transformation of selected human-used macrolide antibacterial agents with iron(III) and manganese(IV) oxides"; Environmental Pollution; vol. 157, Issue 4; pp. 1317-1322; Apr. 2009 (6 pages).

Keleman, Peter et al., "An Overview of the Status and Challenges of CO2 Storage in Minerals and Geological Formations"; Frontiers in Climate; vol. 1, Article 9; pp. 1-20; Nov. 15, 2019 (20 pages).

Hills, Colin D. et al., "Mineralization Technology for Carbon Capture, Utilization, and Storage"; Frontiers in Energy Research; vol. 8, Article 142; pp. 1-14; Jul. 14, 2020 (14 pages).

Schaefer, Martha W., "Measurements of iron(III)-rich fayalites"; Nature; vol. 303, Issue 5915; pp. 325-327; May 26, 1983 (3 pages).

Pogge Von Strandmann, Philip A. E. et al., "The Dissolution of Olivine Added to Soil at 4° C.: Implications for Enhanced Weathering in Cold Regions"; Frontiers in Climate; vol. 4, Article 827698; pp. 1-11; Feb. 10, 2022 (11 pages).

Neubeck, Anna et al., "Formation of H2 and CH4 by weathering of olivine at temperatures between 30 and 70° C." Geochemical Transactions; vol. 12, Issue 1, Article: 6; pp. 1-10; Dec. 2011 (10 pages).

Wogelius, Roy A et al., "Olivine dissolution at 25° C.: Effects of pH, CO2, and organic acids"; Geochimica et Cosmochimica Acta; vol. 55, Issue 4; pp. 943-954; Apr. 1991 (12 pages).

Muneishi, Keisuke et al., "Interactions between organic compounds and olivine under aqueous conditions: A potential role for organic distribution in carbonaceous chondrites"; Meteoritics & Planetary Science; vol. 56, Issue 2; pp. 195-205; Feb. 2021 (11 pages).

AradÓttir, Edda S.P. et al., "CarbFix: a CCS pilot project imitating and accelerating natural CO2 sequestration"; Greenhouse Gases: Science and Technology; vol. 1, Issue 2; pp. 105-118; Jun. 2011 (14 pages).

Aradóttir, E.S.P. et al., "Multidimensional reactive transport modeling of CO2 mineral sequestration in basalts at the Hellisheidi geothermal field, Iceland"; International Journal of Greenhouse Gas Control; vol. 9; pp. 24-40; Jul. 2012 (17 pages).

Min, Baehyun et al., "Selection of Geologic Models Based on Pareto-Optimality Using Surface Deformation and CO2 Injection Data for the in Salah Gas Sequestration Project"; Proceedings of the SPE Annual Technical Conference and Exhibition; Paper No. SPE-181569-MS; pp. 1-25; Sep. 26, 2016 (25 pages).

Hovorka, Susan D., "Optimization of Geological Environments for Carbon Dioxide Disposal in Saline Aquifers in the United States"; Bureau of Economic Geology, Jackson School of Geosciences, The University of Texas at Austin; Contract No. DE-AC26-98FT40417; May 2009 (480 pages).

* cited by examiner

Mineralogy-Sensing Transformative Tracer

600

900

902

904

906

908

910

912

914

916

901

1000

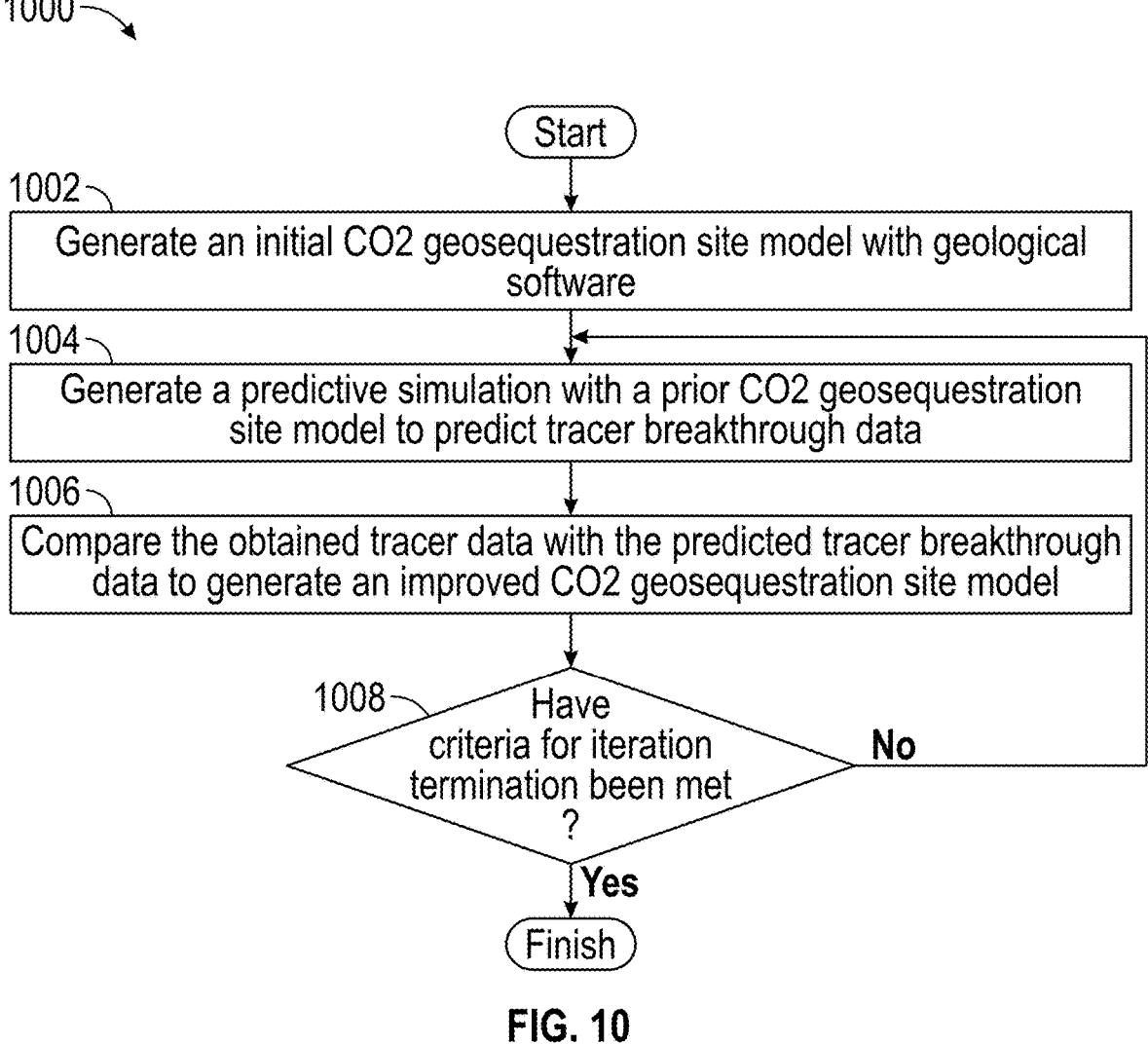

Start

1002
Generate an initial CO2 geosequestration site model with geological software 1004
Generate a predictive simulation with a prior CO2 geosequestration site model to predict tracer breakthrough data 1006
Compare the obtained tracer data with the predicted tracer breakthrough data to generate an improved CO2 geosequestration site model 1008
Have criteria for iteration termination been met ?

No

Yes

Finish

FIG. 10

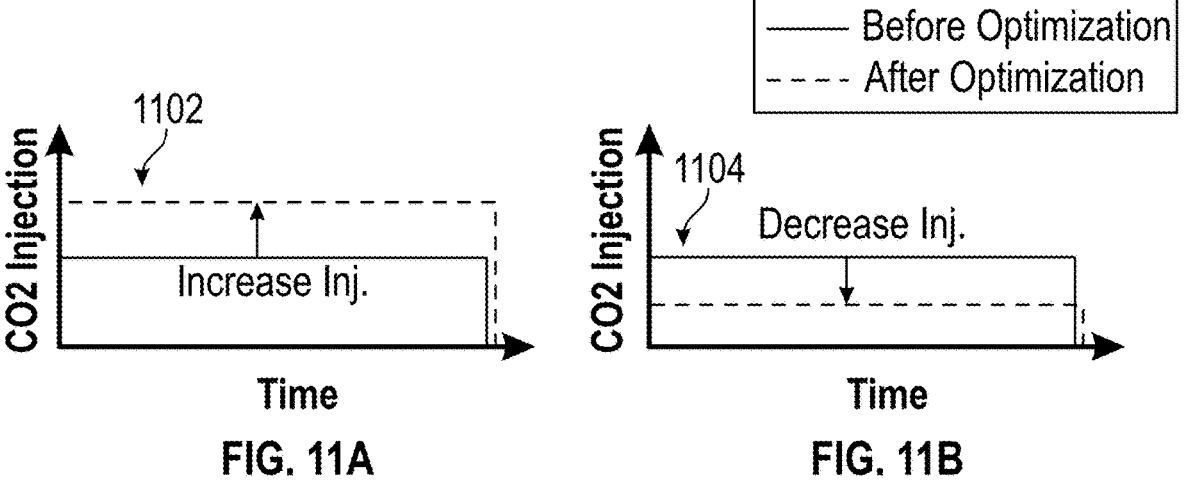
FIG. 11A
FIG. 11B
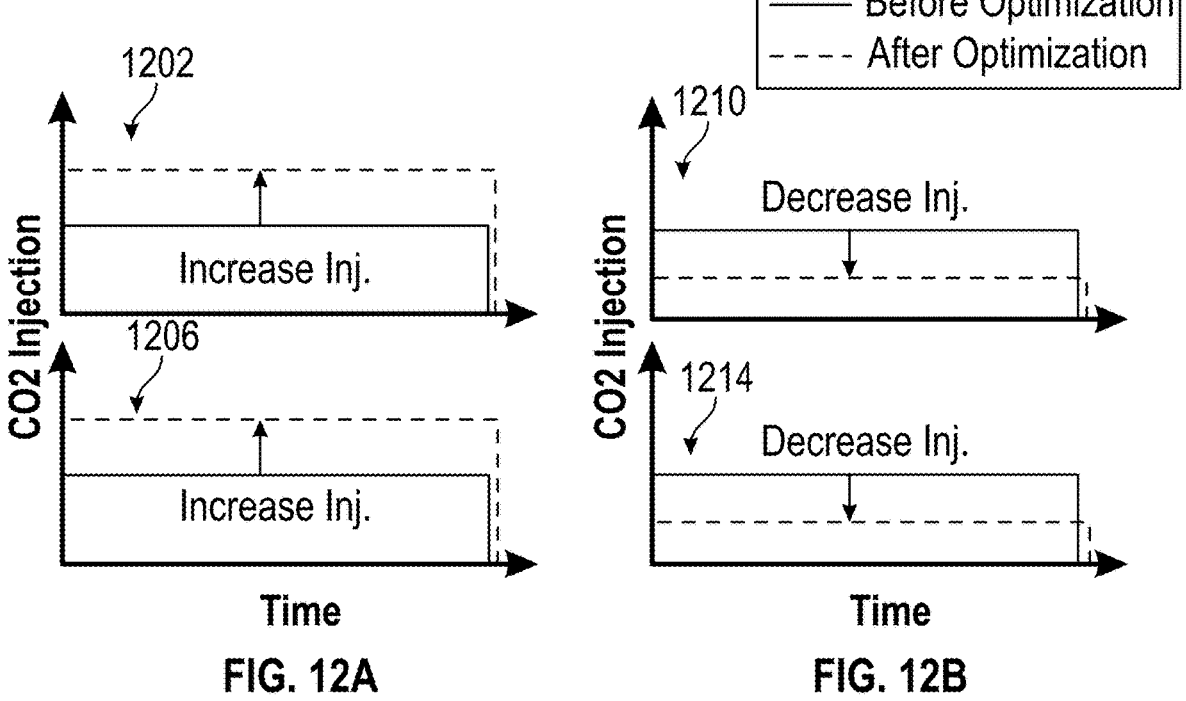
FIG. 12A
FIG. 12B

1300

OPTIMIZING CO$_2$ GEOSEQUESTRATION WITH RESPONSIVE TRACERS

BACKGROUND

Carbon dioxide (CO$_2$) geosequestration is important for addressing the issue of climate change as CO$_2$ is one of the main greenhouse gases that causes the temperature of the Earth to rise. CO$_2$ is released into the atmosphere as a result of human activities, such as burning fossil fuels for energy, transportation, and manufacturing. Increased levels of CO$_2$ in the atmosphere leads to a rise in temperature, which is leading to several negative impacts, including rising sea levels, more frequent and intense heat waves, droughts, and extreme weather events. Geosequestration provides a method for reducing the amount of CO$_2$ released into the atmosphere by capturing CO$_2$ before it is released and storing it underground in geological formations, which can help to mitigate the impacts of climate change. In addition, geosequestration can also be a valuable tool for reducing the carbon footprint of existing power plants and other industrial facilities, allowing them to continue to operate while reducing their impact on the environment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for sequestering carbon dioxide (CO$_2$) in a formation including providing an injection well extending into the formation, injecting a tracer into the injection well to the formation, collecting the tracer at a surface of the formation, obtaining tracer data from the collected tracer, determining, by a computer system, a geological property with the obtained tracer data and a history matching algorithm, and optimizing a CO$_2$ injection rate for CO$_2$ sequestration in the formation based on the determined geological property.

In another aspect, embodiments herein relate to a method for determining a geological property of a formation including injecting a tracer into an injection well that extends into the formation, collecting the tracer at a surface of the formation, obtaining tracer data from the collected tracer, and determining, by a computer system, the geological property with the obtained tracer data and a history matching algorithm.

In another aspect, embodiments herein relate to a system for carbon dioxide (CO$_2$) sequestration and determining geological properties of a formation. The system includes an injection well extending from a surface into a formation, an injection system in fluid communication with the injection well, a production well extending from the surface into the formation, a tracer detection system located at the surface, and a control system coupled to the tracer detection system and configured to sequester CO$_2$ in the formation. The injection system may include an injection fluid containing a tracer. The production well may be spaced apart from the injection well.

The tracer detection system may include at least one detection unit configured to detect the tracer when produced from the production well to generate tracer data. The control system may include a computer system, and a non-transitory computer readable medium storing instructions executable by the computer system. The instructions may include functionality for obtaining tracer data from the tracer produced from the production well, and determining, by the computer system, a mineralogy distribution of the formation, a porosity distribution of the formation, or both with the obtained tracer data and a history matching algorithm.

Other aspects and advantages of the claimed subject matter will be apparent from the following description and the appended claims.

BRIEF DESCRIPTION OF DRAWINGS

FIG. 2 shows the chemical structure of clarithromycin that can undergo mineral surface catalysis in the presence of certain minerals in accordance with one or more embodiments.

FIG. 10 is a method for determining a geological property in accordance with one or more embodiments.

FIGS. 11A-B show CO$_2$ geosequestration injection schedules for a formation with two single well injection sites before (solid traces) and after (dashed traces) optimization in accordance with one or more embodiments.

FIGS. 12A-B show CO$_2$ geosequestration injection schedules of a formation with multiple inter well systems before (solid curves) and after (dashed curves) optimizations in accordance with one or more embodiments.

DETAILED DESCRIPTION

Figure 1:
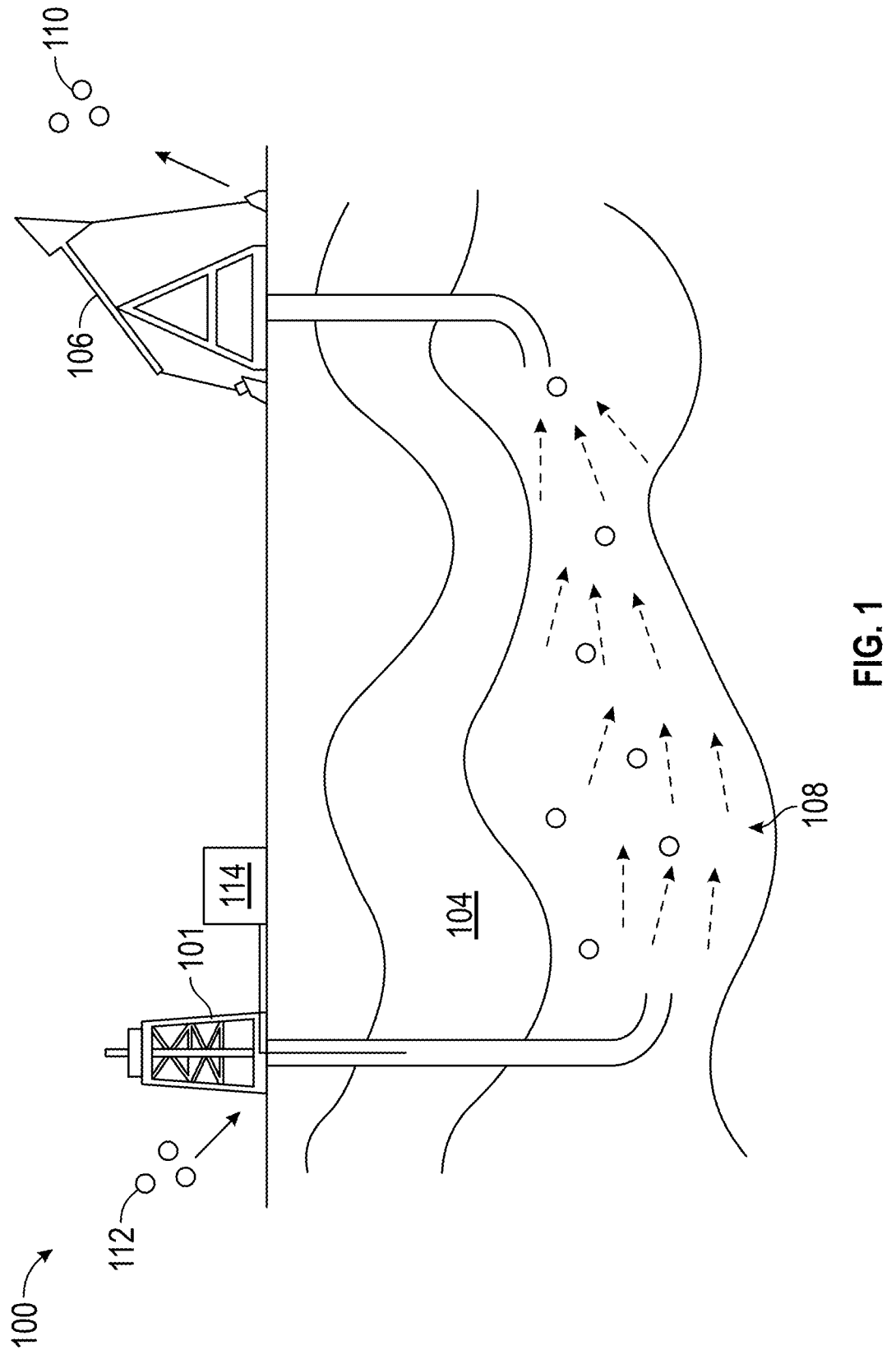
FIG. 1 is a simplified well environment in accordance with one or more embodiments.

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

As used herein, the term "coupled" or "coupled to" or "connected" or "connected to" may indicate establishing either a direct or indirect connection and is not limited to either unless expressly referenced as such. Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Geosequestration is an important component of a comprehensive strategy for addressing the issue of climate change, as it provides a way to reduce the amount of $CO_2$ in the atmosphere and slow the rate of global warming. $CO_2$ geosequestration may be performed in geological formations, such as depleted oil and gas fields, saline aquifers, and deep coal seams. However, there are several technical challenges associated with $CO_2$ traditional geosequestration, which include the safety and security of the storage, monitoring and verification of the storage, injection and storage capacity of the formation, along with mineralogical challenges.

One of the main technical challenges is ensuring that the $CO_2$ is securely stored underground such that there is no risk of it leaking back into the atmosphere. This requires a deep understanding of the geology of potential storage sites and the selection of sites that are suitable for long-term storage. The $CO_2$ must be stored in a way that prevents it from escaping, such as injection into deep, porous rock formations that are overlain by an impermeable layer. An additional challenge is the ongoing monitoring and verification that is necessary to ensure that the $CO_2$ remains securely stored underground. This requires the use of monitoring wells, seismicity monitoring, and other techniques to detect any potential leaks or other issues. Further, the capacity of a storage site to store $CO_2$ safely and securely will depend on several factors, including the depth and permeability of the storage formation, the presence of any existing geological faults or fractures, and the presence of any overlying or underlying aquifers that could be impacted by the injection of $CO_2$.

In addition to the technical challenges of $CO_2$ geosequestration, there are several mineralogical challenges related to the geological storage of $CO_2$, which include mineral dissolution and precipitation, reaction kinetics, sequestration efficiency, formation brittleness, and mineral storage capacity. For example, the injection of $CO_2$ into geological formations can lead to the dissolution and precipitation of minerals, which could change the permeability and porosity of the storage formation and potentially impact the long-term security of the storage. The storage capacity of a formation is also influenced by its mineralogy, as certain minerals can adsorb or retain more $CO_2$ than others. Additionally, the reaction kinetics of $CO_2$ with minerals in the storage formation needs to be understood as reactions with $CO_2$ will impact the rate of mineral dissolution and precipitation, as well as the amount of $CO_2$ that can be stored in the formation. Further, the efficiency of $CO_2$ sequestration is also influenced by certain mineral types and textures that can enhance or reduce the rate of $CO_2$ uptake. The brittleness of the storage formation can also impact the safety of $CO_2$ geosequestration, as a brittle formation can be more susceptible to fracture, which could release stored $CO_2$.

Embodiments of the present disclosure relate to systems and methods for understanding the mineralogy of potential $CO_2$ geosequestration and storage sites and developing advanced imaging and analytical techniques for characterizing the mineralogical composition of geological formations for $CO_2$ geosequestration. One or more embodiments herein relate to the identification the storage sites most suitable for $CO_2$ storage and optimizing the efficiency and safety of $CO_2$ geosequestration.

System for $CO_2$ Sequestration

In one aspect, embodiments disclosed herein relate to a system for performing, promoting, and optimizing $CO_2$ geosequestration. The system may be configured for determining geological properties of a formation to sequester $CO_2$. The system may be located at or coupled to a depleted oil and gas formation, saline aquifer, a deep coal seam, among others determined to generally be suitable for $CO_2$ sequestration and storage. The system of one or more embodiments includes an injection well configured to transport material (e.g., treatment fluids, $CO_2$, a tracer, a carrier fluid, etc.) to a downhole location, a production well configured to produce materials (e.g., formation fluids, an injected tracer, injected treatment fluids, etc.) from the formation, an injection system in fluid communication with the injection well, a tracer detection system located at the surface of the formation, and a control system coupled to the tracer detection system.

FIG. 1 is a simplified diagram showing an example of a multi-well formation that includes a system 100 in accordance with one or more embodiments. The system may be configured to use an injected tracer in a solution to determine formation mineralogy, porosity, or both and to sequester $CO_2$. A tracer 112 is introduced into a formation 104 from an injection system 114 into an injection well at a first location 101 and propagates through at least a portion (represented by arrows 108) of the formation 104. Prior to injection in the formation 104, the tracer 112 may be dissolved in an injection fluid or dispersed in an injection fluid in the injection system 114. For tracers used in inter-well formations, such as the formation shown in FIG. 1, a fluid sample 110 is collected from a production well at a second location 106 different from a first location 101. In a single-well system, the fluid sample may be collected from the same well used for injection. The fluid sample 110, which includes the tracer, is subjected to evaluation by one or more tracer detection systems and processes. The measured data obtained by the tracer detection system(s) may be used to determine one or more geological properties of the formation, determine $CO_2$ injection properties for the formation, or both in a control system (not shown) of the system 100.

As mentioned above, the injection well and the production well of one or more embodiments may be the same well such that a material is injected and produced from the same well. In such embodiments, the system may be configured to pause wellbore activities for a period of time to allow for interaction between the formation and the injected tracer. The system may be configured to resume production activity to recover fluid sample(s) after the holding period has completed.

In some embodiments, the injection well and the production well are different wells provided in different locations of the formation. The production well and the injection well are in fluid (e.g., hydraulic) communication. In some embodiments, the production well includes at least one production well in fluid communication with the injection well via formation pathways formed through interconnecting porosity and fractures in the formation between the wells. The system may include a plurality of injection wells that are different from and in fluid communication with the injection well via formation pathways in the formation between the wells. The system may be configured to inject an inter-well tracer to the formation and produce the inter-well tracer from at least one production well provided in the formation. In some instances, an inter well tracer may be produced from more than one production well of the formation. The injection well and the production well may each extend from a surface location of the formation to a subsurface location in the formation.

The system may use at least one tracer prepared in a tracer solution to characterize, evaluate, and determine one or more geological properties of a subsurface $CO_2$ geosequestration site. The system may include an injection system in fluid communication with the injection well. In some embodiments, the injection system may be configured to inject a prepared tracer solution containing an injection fluid and at least one tracer. Collection of injected tracers returned to the surface may be used to analyze characteristics of the formation through which the tracers were injected. Such collection of returned tracers may indicate how easily the tracers move through and are returned from a formation, and thus may be referred to as tracer "breakthrough." In single well systems, tracer breakthrough may be determined from the timing in which tracers are returned from a single well after injection of the tracer into the well. In multi-well systems, tracer breakthrough may be determined from the timing in which tracers are produced from a producer well(s) after injection of the tracer into an injection well(s).

In some embodiments, the tracer solution is a single-type tracer solution including a mineralogy-sensing tracer, such as a mineralogy-sensing transformative tracer, in an injection fluid.

In some embodiments, the injection system is configured to inject a tracer solution that is a multi-type tracer solution including more than one tracer type into the formation via the injection well. The multi-type tracer solution may include two or more of a mineralogy-sensing tracer (i.e., a transformative tracer, a retentive tracer, or both), a passive tracer, and a porosity-sensing tracer.

In particular embodiments, a multi-type tracer solution includes a passive tracer, a porosity sensing tracer, and an injection fluid. The system may be configured to compare the difference between the breakthrough of the porosity sensing tracer to the breakthrough of the passive tracer to determine porosity data of the formation. In some embodiments, a multi-type tracer solution may include a passive tracer, a mineralogy-sensing retentive tracer, and an injection fluid. In such embodiments, the system is configured to compare the difference between the breakthrough of the mineralogy-sensing retentive tracer to the breakthrough of the passive tracer to determine mineralogy data of the formation.

In some embodiments, a tracer solution includes a passive tracer, a porosity-sensing tracer, a mineralogy-sensing transformative tracer, and an injection fluid. The system may be configured to determine both mineralogy data and porosity data of the formation from a transformed mineralogy-sensing transformative tracer collected from the production well and by comparing the breakthroughs of the passive tracer and the porosity sensing tracer in a production well, respectively. The mineralogy data and the porosity data obtained from the tracers may be included as data inputs in the tracer data generated by the system.

In some embodiments, a tracer solution may include a passive tracer, a porosity-sensing tracer, and a mineralogy-sensing retentive tracer. In such embodiments, the system is configured to determine both mineralogy data and porosity data of the formation. The mineralogy data may be determined from the difference in breakthroughs of the mineralogy-sensing retentive tracer compared to the passive tracer in the production well. The porosity data is determined from the difference in breakthroughs of the passive tracer and the porosity-sensing tracer in a production well. The mineralogy data and the porosity data obtained from the tracers may be included as data inputs in the tracer data generated by the system.

The injection fluid of a tracer solution may be an aqueous carrier fluid. The aqueous carrier fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. The water used may naturally contain contaminants, such as salts, ions, minerals, organics, and combinations thereof, as long as the contaminants do not interfere with the tracer operation. Additional components, including but not limited to viscosifiers, polymers, surfactants, among others, may be added to the tracer solution to enhance the dissolution or dispersion of the tracers in the fluid. Suitable surfactants may include anionic surfactants, cationic surfactants, and zwitterionic surfactants known in the art. Non-limiting examples of viscosifiers include xanthan gum, polymers commonly used in enhanced oil recovery operations, such as AN-132, and combinations thereof.

A tracer may be added to an injection fluid to form a tracer solution in an amount in a range from 1 to 1000 kg (kilograms). The amount of tracer added to injection fluids may be in a range with a lower limit of any one of 1 kg, 5 kg, 10 kg, 25, kg, 50 kg, 100 kg, 250 kg, 500 kg, and 750 kg and an upper limit of any one of 10 kg, 25, kg, 50 kg, 100 kg, 250 kg, 500 kg, 750 kg, and 1000 kg where any lower limit may be paired with any mathematically compatible upper limit. In some embodiments, the tracer is included in the tracer solution in a concentration in a range from 1 ppm (parts per million) to 100,000 ppm based on the total weight of the tracer solution. The tracer may be included in the tracer solution in an amount in a range with a lower limit of any one of 1 ppm, 5 ppm, 10 ppm, 50 ppm, 100 ppm, 250 ppm, 500 ppm, 1000 ppm, 2500 ppm, 5000 ppm, 10,000 ppm, 25,000 ppm, and 50,000 ppm and an upper limit of any one of 100 ppm, 500 ppm, 1000 ppm, 5000 ppm, 10,000 ppm, 25,000 ppm, 50,000 ppm, 70,000 ppm, 80,000 ppm, 90,000 ppm, and 100,000 ppm, where any lower limit may be paired with any mathematically compatible upper limit. In one or more embodiments, a tracer may be added to an injection fluid in a weight from the range provided above to achieve a concentration in the range provided above.

In some embodiments, the tracer solution includes a passive tracer. A passive tracer is configured to traverse the pathways of the formation (e.g., created via formation porosity and/or fractures) without significant interaction with geological characteristics of the formation. A passive tracer may include at least one material selected from the group consisting of dipicolinic acid (DPA), 4,7-bis (sulfonatophenyl)-1,10-phenanthroline-2,9-dicarboxylic acid (BSPPDA), 2-fluorobenzoic acid, 3-fluorobenzoic acid, 4-fluorobenzoic acid, 2,3-difluorobenzoic acid, 2,4-difluorobenzoic acid, 2,5-difluorobenzoic acid, 3,4-difluorobenzoic acid, sodium thiocyanate (NaSCN), sodium bromide (NaBr), and combinations thereof.

In some embodiments, the tracer solution includes a porosity-sensing tracer. A porosity-sensing tracer may be configured to characterize a subsurface formation porosity by determining the size of the porosity-sensing tracer that is able to move through the formation. The injected tracer may be a porosity-sensing tracer. A porosity-sensing tracer may include at least one polymer. Non-limiting examples of polymers include zwitterionic and fluorinated copolymers, such as poly(1-vinyl imidazole-co-4-trifluoromethylstyrene), poly(3-(1-vinyl-1H-imidazol-3-ium-3yl)propane-1-sulfonate-co-4-trifluoromethylstyrene), poly(3-(1-vinyl-1H-imidazol-3-ium-3 yl)propane-1-sulfonate), poly(2-(methacryloyloxy)ethyl 2-(trimethylammonio)ethyl phosphate), poly(2-((2-(Methacryloyloxy)ethyl)dimethylammonio)acetate), poly(3-((2-(Methacryloyloxy)ethyl)dimethylammonio)propionate, poly(3-((3-Acrylamidopropyl)dimethylammonio)propanoate), poly(3-((2-(Methacryloyloxy)ethyl)dimethylammonio)propane-1-sulfonate), poly(4-((2-(Methacryloyloxy)ethyl)(dimethyl)ammonio)-1-butanesulfonate), poly(3-((2-(Acryloyloxy)ethyl)dimethylammonio)propane-1-sulfonate), poly(3-((3-Methacrylamidopropyl)dimethylammonio)propane-1-sulfonate), poly(4-((3-Methacrylamidopropyl)dimethylammonio)butane-1-sulfonate), and poly (3-((3-Acrylamidopropyl)dimethylammonio)propane-1-sulfonate).

The porosity-sensing tracer may include at least one polymer that contains one or more monomers selected from the group consisting of saccharides, sulfonated monomers, hydroxylated monomers, zwitterionic monomers, fluorinated monomers, and combinations thereof. As one of ordinary skill can appreciate, the polymers can be synthesized from one or more monomers via ring-opening polymerization or step-growth polymerization, allowing for the growth of very high molecular weight polymers, or controlled/living radical polymerization techniques. Synthesized polymers may provide sufficient control over the molecular weight and polydispersity of the polymer product to achieve a target size suitable for use in a specific formation. For example, in one or more embodiments, polymers used may be synthesized by reversible addition-fragmentation chain-transfer (RAFT), atom transfer radical polymerization (ATRP), and activator regenerated by electron transfer atom transfer radical polymerization (ARGET ATRP), among others.

In some embodiments, the synthesized polymer has a relatively uniform polydispersity (i.e., chains of substantially the same length) as compared to commercially available polymers. As one of ordinary skill may appreciate, the polydispersity of a polymer relates to either a ratio of either the weight-average molar mass to the number-average molecular weight or the degree of polymerization to the number-average degree of polymerization. The polydispersity of the polymer may be at least 1. In some embodiments, the polydispersity of the polymer is greater than 1. The polydispersity of the polymer may be at least 1, at least 1.05, at least 1.1, at least 1.2, or at least 1.5. In some embodiments, the polydispersity may range from a lower limit of any one of 1.05, 1.1, and 1.15 to an upper limit of any one of 1.5, 2, 3, 5, and 10.

The molecular weight of the polymer may be in a range from 10 kDa (kiloDaltons) to 30,000 kDa. The polymer has a size in a range of a lower limit of any one of 10 kDa, 20 kDa, 30 kDa, 100 kDa, 500 kDa, 1,000 kDa, 5,000 kDa, and 10,000 kDa and an upper limit of any one of 1,000 kDa, 5,000 kDa, 10,000 kDa, 20,000 kDa, and 30,000 kDa, where any lower limit may be paired with any mathematically compatible upper limit.

The polymer may have a size larger than a portion of the pores of a formation such that the polymer having the larger size is configured to bypass the relatively smaller pores of the formation, referred to as inaccessible pore volume (IPV). IPV may be measured as a percentage of total pore volume in a formation. Unlike conventional particle-type tracers, which may get stuck in IPV, polymer porosity-sensing tracers according to embodiments disclosed herein may bypass IPV and be collected at the surface, which may be used to indicate porosity in the formation. As one of ordinary skill may appreciate, dissolved polymers can form various conformations in solution, such as random coils, aggregates, or clusters, as a result of temperature, concentration, or polymer-polymer interactions or interactions between the polymer and the solvent. In some embodiments, a porosity sensing tracer that includes a polymer can have a measurable hydrodynamic radius. In such embodiments, the mechanism for porosity-sensing is a size exclusion mechanism in which a polymer having a relatively larger hydrodynamic radius will not enter into the smaller pores of the formation and the polymer having a smaller hydrodynamic radius will enter into at least a portion of the smaller pores of the formation. Thus, the polymer having the smaller hydrodynamic radius may be retained in the formation for a longer period of time.

The hydrodynamic radius of the polymer used as a porosity-sensing tracer may be in a range from 1 nm (nanometers) to 25 μm (micrometers). For example, the polymer may have a hydrodynamic radius in a range a lower limit of any one of 1 nm, 5 nm, 10 nm, 100 nm, 250 nm, 500 nm, 1 μm, 2.5 μm, and 5 μm and an upper limit of any one of 100 nm, 500 nm, 1 μm, 2.5 μm, 5 μm, 10 μm, 15 μm, and 25 μm, where any lower limit may be paired with any mathematically compatible upper limit.

In some embodiments, the tracer solution includes a mineralogy-sensing tracer, such as a retentive tracer, a transformative tracer, or mixtures thereof. A mineralogy-sensing tracer is configured to collect data relating to the distribution of one or more minerals of a subsurface formation.

A mineral-sensing transformative tracer may include a material or compound that is configured to react with one or more minerals of a formation via mineral surface catalysis, mineral dissolution and release of elemental tracers, and mineral dissolution and release of methane and hydrogen.

Non-limiting examples of mineral sensing-transformative tracers that can undergo mineral surface catalysis may include clarithromycin and roxithromycin, which can each be hydrolyzed and/or oxidized in the presence of minerals, such as olivine-based minerals like fayalite, that contain orthosilicates and metals with a positive oxidation state, such as iron (III) and manganese (IV). In such embodiments, the transformative tracer is an antibiotic tracer (e.g., clarithromycin, roxithromycin, or mixtures thereof) injected to the formation as an original tracer, and the tracer collected from the production well is a transformed tracer, such as a reaction product derived from an interaction between the original tracer and one or more minerals of the formation.

Figure 2:
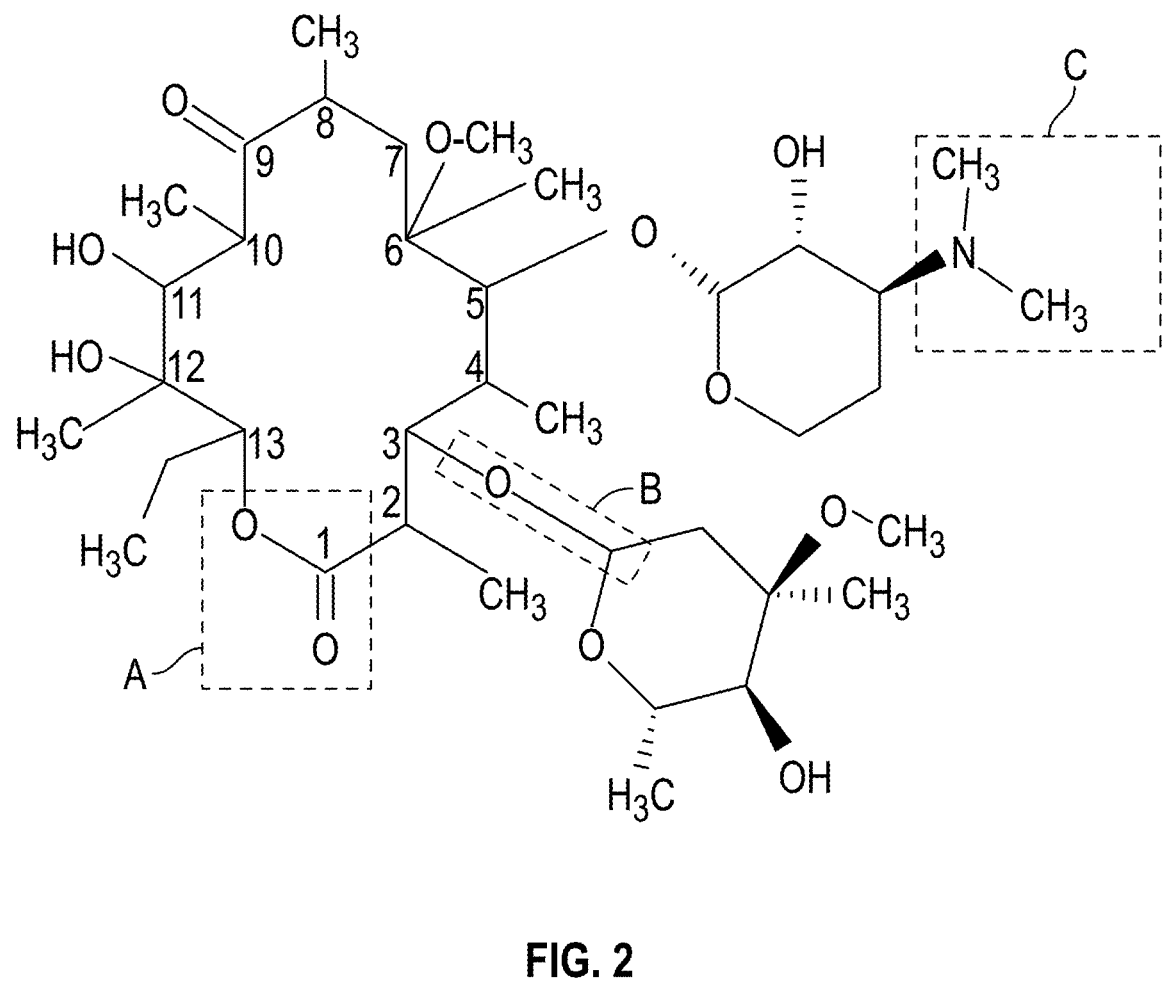

Antibiotics may be particularly useful transformative tracers as they tend to be complex and bulky molecules that can have multiple labile groups that readily undergo transformation in the presence of a metal. As shown in FIG. 2, the structure of clarithromycin includes at least three reactive regions denoted by boxes A, B, and C that can react with minerals of a formation to form a major product (e.g., 90% or more) or a minor product (e.g., 10% or less). The ester of region A may be hydrolyzed and oxidized to form a minor product with a ketone at C13 and a carboxylic acid at C1. The ether of region B may be hydrolyzed to form a major product by removing the pendant sugar from the central ring of clarithromycin and form an alcohol at C2 of the central ring. The nitrogen of region C may undergo a reaction to form a minor product to remove a methylene from the tertiary amine and form a secondary amine.

In some embodiments, a tracer solution including an injection fluid, an acid, or both is a mineralogy-sensing transformative tracer configured to dissolve minerals to promote the release of at least one elemental tracer, at least one small molecule tracer, or both from minerals (e.g., orthosilicate containing minerals such as olivine-based minerals) of the formation. Non-limiting examples of elemental tracers released from minerals of the formation include magnesium (Mg), calcium (Ca), silicon (Si), chromium (Cr), nickel (Ni), copper (Cu), among others. Non-limiting examples of small molecule tracers released from minerals of the formation include methane ($CH_4$), hydrogen ($H_2$), among others.

Embodiments in which an acid is included in the tracer solution can include, but are not limited to, one or more acids selected from hydrochloric acid, carbonic acid, nitric acid, hydrofluoric acid, hydrobromic acid, perchloric acid, fluoroboric acid, methanesulfonic acid, formic acid, acetic acid, citric acid, lactic acid, sulfamic acid, chloroacetic acid, or derivatives, and mixtures thereof. Acid-producing systems may include, but are not limited to, esters, nitriles, lactones, anhydrides, orthoesters, polyesters or polyorthoesters. The acid-producing systems may include esters of short chain carboxylic acids, including, but not limited to, acetic and formic acid, and esters of hydroxycarboxylic acids, including, but not limited to, glycolic and lactic acid. These acid-producing systems may provide the corresponding acids when hydrolyzed in the presence of water.

When an acid is included in the tracer solution, the acid may be included in concentration in a range from 0.1 vol % (volume percent) to 50 vol %. The acid may be included in the tracer solution in a concentration in a range a lower limit of any one of 0.1 vol %, 0.25 vol %, 0.5 vol %, 1.0 vol %, 2.5 vol %, 5 vol %, 10 vol %, 15 vol %, 20 vol %, 30 vol %, and 40 vol % and an upper limit of any one of 10 vol %, 15 vol %, 20 vol %, 30 vol %, 40 vol %, 45 vol %, and 50 vol %, where any lower limit can be paired with any mathematically compatible upper limit.

In some embodiments, the tracer solution includes a mineral-sensing retentive tracer that is configured to bind to a mineral surface, resulting in a delayed transport through the formation. The mineral-sensing retentive tracer may be a chelating tracer or a nitrogen-containing heterocycle. The chelating tracer may be potassium acid phthalate, ascorbic acid, or derivatives or mixtures thereof. The chelating tracer may be configured to chelate with one or more metals of a mineral surface, such as magnesium present on the surface of olivine-based minerals.

The nitrogen-containing heterocycle may be configured to interact with functional groups on the surface of minerals, such as the $SiO_4$ tetrahedra of olivine. Non-limiting examples of a nitrogen-containing heterocycle tracer include imidazole, 2-methylimidazole, 2-methylpyridine, 3-methylpyridine, and combinations, or mixtures, thereof. A nitrogen-containing heterocycle may be selected based on adsorption capabilities in different environments. For example, pyridine-based compounds may be selected as a retentive tracer for adsorption to $SiO_4$ groups in an acidic tracer solution. Imidazole-based compounds may be selected as a retentive tracer for adsorption to $SiO_4$ groups in a neutral tracer solution.

A fluid sample may be collected from the production well to monitor tracer breakthrough. The fluid sample may include a tracer from the injected tracer solution, a transformed tracer produced from interaction of the tracer solution with one or more minerals of the formation, at least one elemental tracer and/or at least one small molecule tracer from minerals of the formation, or mixtures thereof. The system may include a tracer detection system located at the surface of the formation. In some embodiments, the tracer detection system is located at an off-site location such that the fluid sample is analyzed off-site. The tracer detection system may include at least one detection unit configured to detect the tracer in the fluid sample produced from the production well and to generate tracer data. The tracer detection system may include one or more detection units selected from a solid phase extraction (SPE) unit, a gas chromatography-mass spectrometry (GC-MS) system, a high performance liquid chromatography (HPLC) system, a liquid chromatography-mass spectrometry (LC-MS) system, an inductively coupled plasma mass spectrometry (ICP-MS) system, an inductively coupled plasma optical emission spectrometry (ICP-OES) system, an X-ray fluorescence (XRF) system, a Fourier transform infrared spectroscopy (FTIR) system, a gel permeation chromatography (GPC) system, or any combination thereof. As such, the tracer data generated from fluid sample analysis may include raw data obtained from any of the above units.

The system may include a control system coupled to the tracer detection system. The control system may include a computer processor and a non-transitory computer readable medium for storing instructions executable by the computer processor. The instructions may include functionality for obtaining tracer data from a fluid sample including a tracer produced from the production well, and determining a mineralogy distribution of the formation, a porosity distribution of the formation, or both with the obtained tracer data and a history matching algorithm. The control system may be configured to sequester $CO_2$ in the formation based on the determined geological properties (i.e., mineralogy distribution, porosity distribution, or both).

Figure 3:
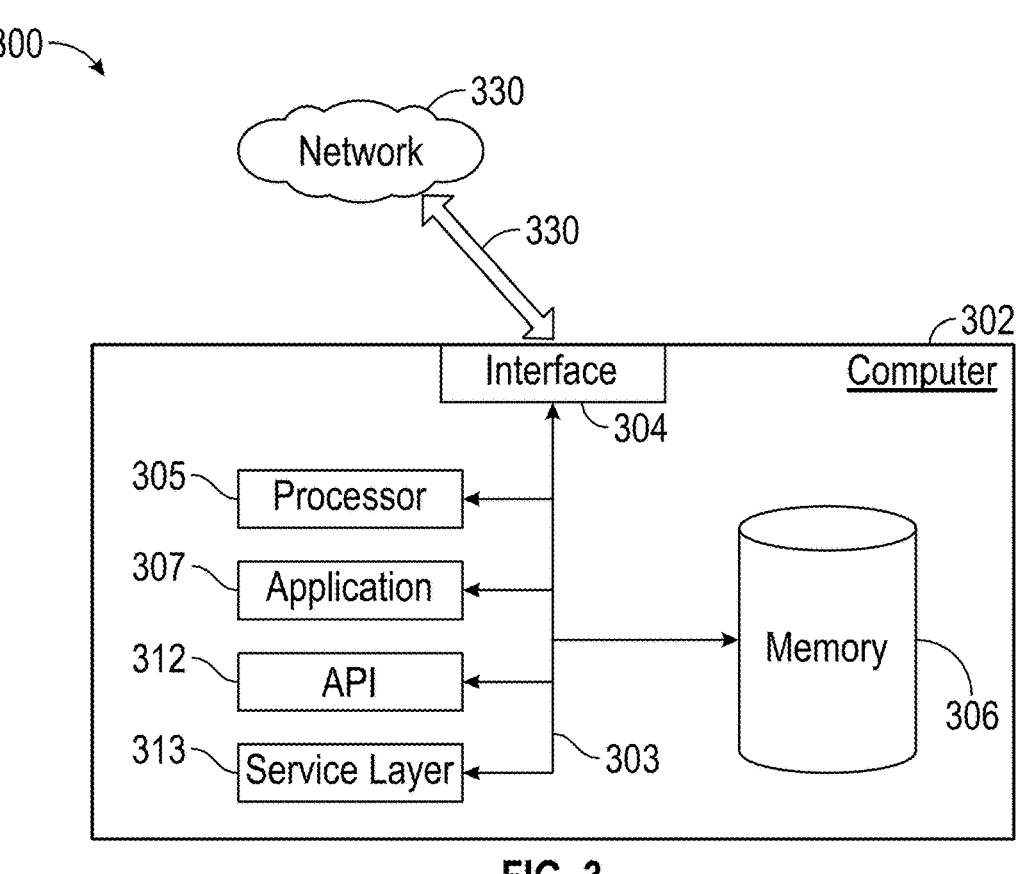
FIG. 3 is a block diagram of a computer system in accordance with one or more embodiments.

As noted above, the control system may include a computer system. For example, the data obtained from the tracer detection system be downloaded using a computer processor of the computer system. In some embodiments, calculations for determining a geological property, optimizing a $CO_2$ injection rate, or both are performed on a computer processor. FIG. 3 is a block diagram of a computer system 300 used to provide computational functionalities associated with described algorithms, methods, functions, processes, flows, and procedures as described in the instant disclosure, according to an implementation. The illustrated computer 302 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may include a computer that includes an input device, such as a keypad, keyboard, touch screen, or other device that can accept user information, and an output device that conveys information associated with the operation of the computer 302, including digital data, visual, or audio information (or a combination of information), or a GUI.

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, business intelligence (BI) server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer.

Software services, such as those provided by the service layer 313, provide reusable, defined business functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330. Generally, the interface 304 includes logic encoded in software or hardware (or a combination of software and hardware) and operable to communicate with the network 330. More specifically, the interface 304 may include software supporting one or more communication protocols associated with communications such that the network 330 or interface's hardware is operable to communicate physical signals within and outside of the illustrated computer 302.

The computer 302 includes at least one computer processor 305. Although illustrated as a single computer processor 305 in FIG. 3, two or more processors may be used according to particular needs, desires, or particular implementations of the computer 302. Generally, the computer processor 305 executes instructions and manipulates data to perform the operations of the computer 302 and any algorithms, methods, functions, processes, flows, and procedures as described in the instant disclosure.

The computer 302 also includes a memory 306 that holds data for the computer 302 or other components (or a combination of both) that can be connected to the network 330. For example, memory 306 can be a database storing data consistent with this disclosure. Although illustrated as a single memory 306 in FIG. 3, two or more memories may be used according to particular needs, desires, or particular implementations of the computer 302 and the described functionality. While memory 306 is illustrated as an integral component of the computer 302, in alternative implementations, memory 306 can be external to the computer 302.

Application 307 is an algorithmic software engine providing functionality according to particular needs, desires, or particular implementations of the computer 302, particularly with respect to functionality described in this disclosure. For example, application 307 can serve as one or more components, modules, applications, etc. Further, although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

In some embodiments, the computer 302 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (Saas), mobile "backend" as a service (MBaaS), serverless computing, artificial intelligence (AI) as a service (AIaaS), and/or function as a service (FaaS).

Method for Sequestering Carbon Dioxide ($CO_2$) of a Formation

In another aspect, embodiments herein relate to a method for determining a geological property of a formation to sequester $CO_2$. The method may include providing a system for sequestering $CO_2$. The system may be as described above.

Figure 4:
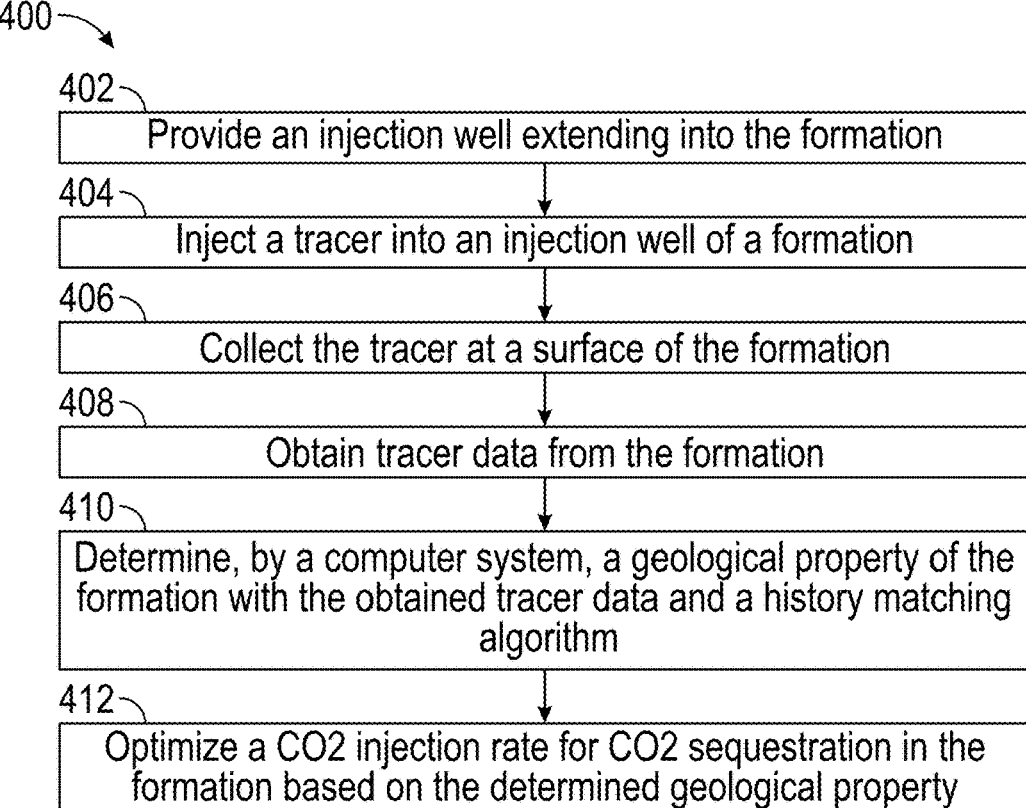
FIG. 4 is a method for sequestering CO$_2$ in accordance with one or more embodiments.

FIG. 4 is a method 400 for sequestering $CO_2$ in accordance with one or more embodiments. In block 402, the method 400 includes providing an injection well that extends to a downhole location of a formation such that a tracer solution may be transported from a surface location (e.g., via an injection system) to the formation. The method may include applying a pressure in the injection well to inject the tracer a distance into the formation. In some embodiments, the method includes preparing a tracer solution that includes an injection fluid. Preparing the tracer solution may include adding one or more of a passive tracer, a porosity-sensing tracer, and a minerology-sensing tracer to the injection fluid. In some embodiments, preparing the tracer solution may include adding one or more acids described above to the injection fluid. The tracer solution may be prepared at a surface location in an injection system proximate to the injection well. The tracer solution may be prepared at an off-site location and transported to an injection system at a surface location proximate to the injection well.

In some embodiments, a tracer solution may be injected to the formation via an injection system in fluid communication well as shown in block 404. The formation may be monitored for tracer breakthrough, as indicated by an event or a series of events when the tracer of the tracer solution accesses the production well after injection in the formation via the injection well. The tracer may include one or more tracers as described above.

In some embodiments, the production well is the same as the injection well such that a single-well treatment method is performed. The method for treating a single-well system in a formation may include a push-and-pull method in which a tracer is injected into a well, operations are paused for a period of time to allow for interactions with the pores and/or minerals of the formation and the tracer solution, and fluids including the tracer are then produced to the surface from the same well.

Figure 5A:
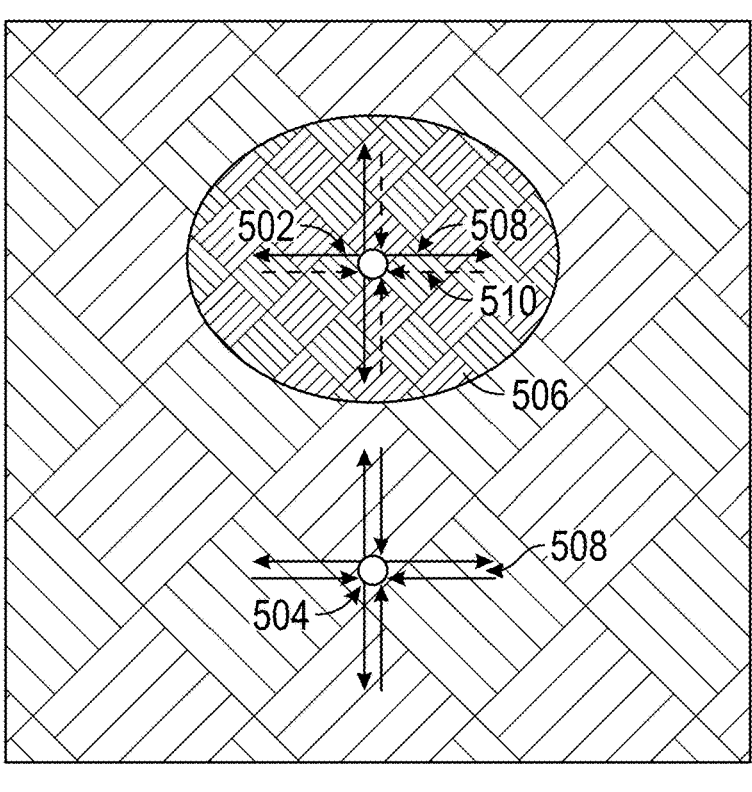
FIG. 5A shows a non-limiting example of a CO$_2$ geosequestration site with two single-well injection sites in accordance with one or more embodiments.

FIG. 5A shows a non-limiting example of a $CO_2$ geosequestration site 500 with two single-well injection sites (e.g., sites 502 and 504) in accordance with one or more embodiments. In single-well injection site 502, there are $CO_2$-reactive olivine minerals 506 present in the subsurface formation surrounding the injection site. In FIG. 5A, a minerology-sensing transformative tracer may be injected into the formation in the form of a tracer solution via each injection site 502 and 504, which is represented by arrows 508. The transformed tracer (represented by dashed arrows 510) may be recovered from site 502 after allowing the tracer to interact with the subsurface formation for a period of time. As there is an absence of reactive minerals in the formation at injection site 504, the original tracer may be recovered from injection site 504. As described above, the original tracer may be one or more selected from a group consisting of a compound that interacts with minerals of the formation, a solution of acid and an injection fluid, or pulses of an aqueous injection fluid.

Figure 5B:
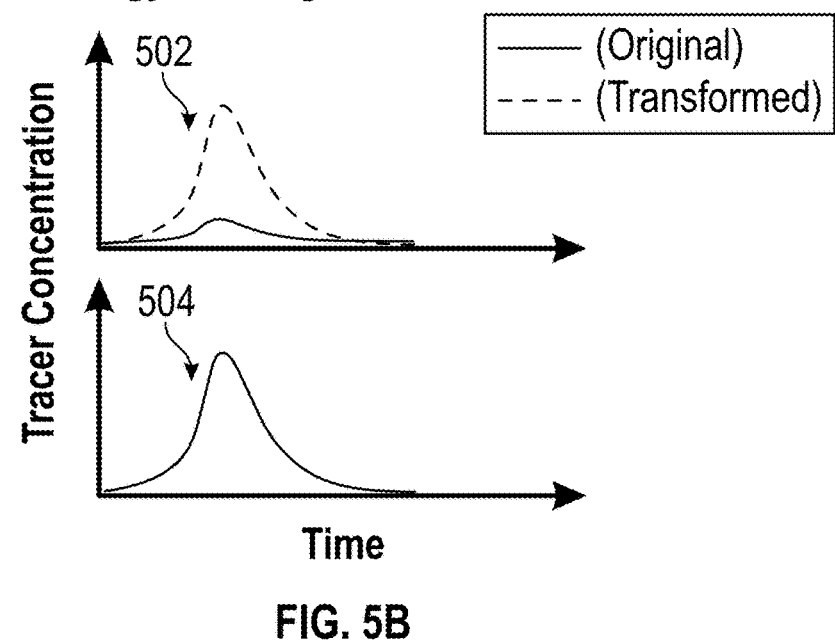
FIG. 5B is a graphical representation of tracer breakthrough data determined from fluid samples obtained from single-well sites of FIG. 5A in accordance with one or more embodiments.

FIG. 5B is a graphical representation of tracer breakthrough data determined from fluid samples obtained from single-well injection site 502 and single-well injection site 504 of FIG. 5A in accordance with one or more embodiments. The solid lines of the graphs represent the original minerology-sensing transformative tracers recovered from each single-well site. The dashed lines represent the transformed minerology-sensing transformative tracers recovered from each single-well site. As shown in FIG. 5B, transformed tracers can be detected in a greater concentration over time as compared to the original tracer from site 502 as a result of the olivine minerals present in the surrounding subsurface formation.

Figure 6A:
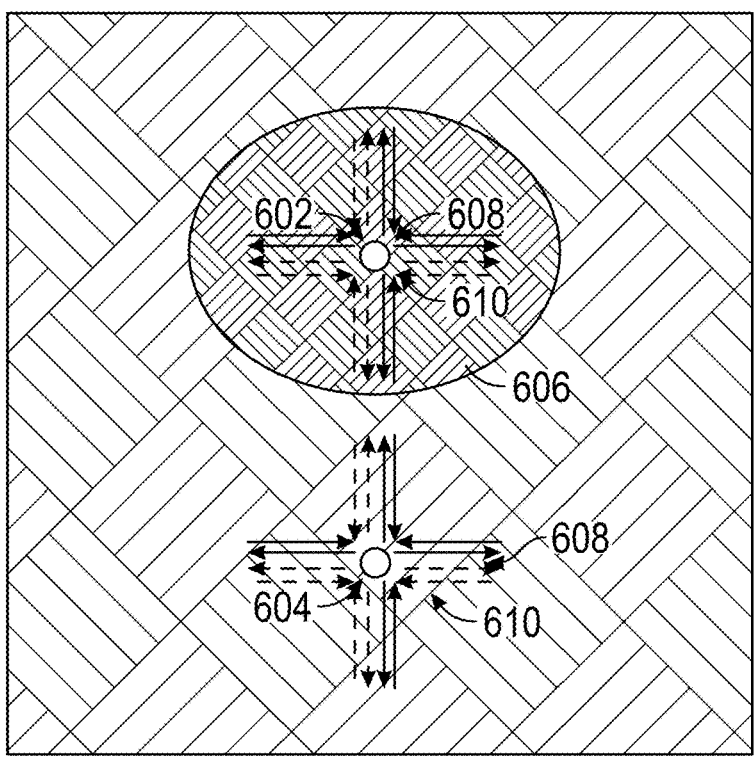
FIG. 6A is a non-limiting example of a CO$_2$ geosequestration site with two single-well injection sites in accordance with one or more embodiments.

FIG. 6A shows a non-limiting example of a $CO_2$ geosequestration site 600 with two single-well injection sites (denoted by 602 and 604) in accordance with one or more embodiments. In single-well injection site 602, there are $CO_2$-reactive olivine minerals 606 present in the subsurface formation surrounding the injection site. A tracer solution that includes a minerology-sensing retentive tracer and a passive tracer are introduced to the formation via each injection site 602 and 604. Wellbore operations may be paused after introducing the tracer solution into each injection site to allow for mineralogy-sensing retentive tracer interaction with the minerals in each formation site (represented by dashed arrows 610). The passive tracer (represented by solid arrows 608) may have limited interaction with the formation at each site such that the passive tracer is provided to compare as a baseline breakthrough time to a breakthrough time of a retentive tracer.

Figure 6B:
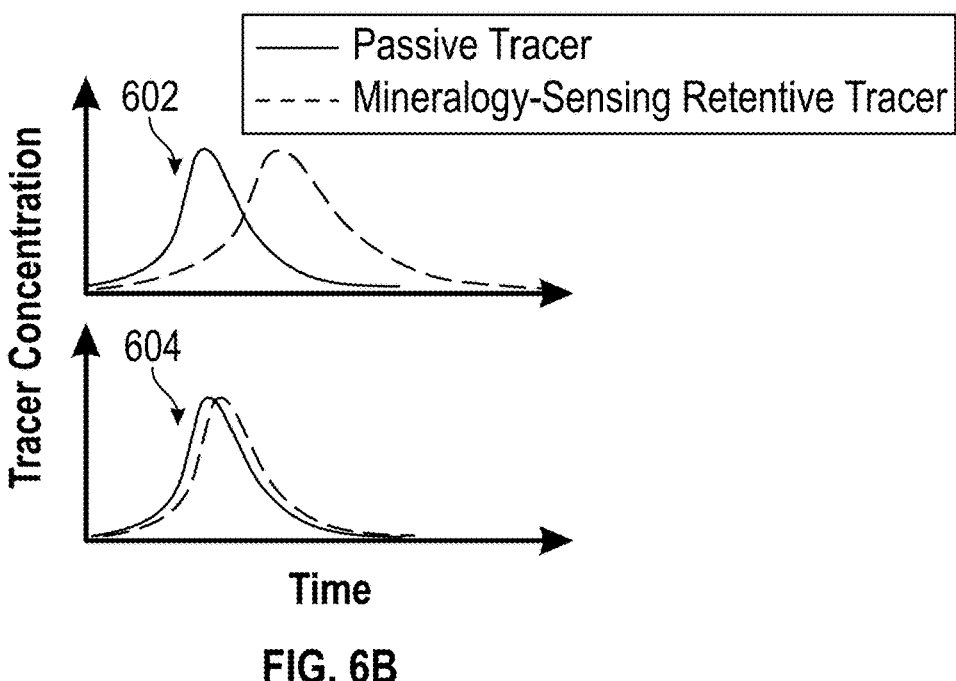
FIG. 6B is a graphical representation of tracer breakthrough data determined from fluid samples collected from single-well sites of FIG. 6A in accordance with one or more embodiments.

FIG. 6B is a graphical representation of tracer breakthrough data determined from fluid samples collected from single-well injection site 602 and single-well injection site 604 of FIG. 6A in accordance with one or more embodiments. The solid lines of each graph represent data for the passive tracer, and the dashed lines of each graph represent data for the minerology-sensing retentive tracer. As noted above, the retentive tracer has a delayed breakthrough time (i.e., concentration maximum) from site 602 due to the presence of olivine minerals that delay the production of such tracers from the well due to mineral surface interactions as compared to passive tracers that do not generally interact with minerals in the formation. The passive tracer may have limited interaction with the olivine minerals such that no delay in production to the surface of the well is observed. As shown in FIG. 6B, a delay in the production of a minerology-sensing retentive tracer can be detected when compared to a passive tracer from site 602. In contrast, production of a mineralogy-sensing retentive tracer is not significantly delayed as compared to a passive tracer in a single-well injection site 604 that does not contain olivine minerals.

Referring back to FIG. 4, the method 400 of one or more embodiments may include providing a production well of the formation at a location that is spaced apart from an injection well provided in the formation. In some embodiments, a plurality of production wells are provided at locations different from the injection well to monitor tracer breakthrough in different locations. The plurality of production wells may be in fluid communication with at least one injection well. The production well or the plurality of production wells are in fluid and hydraulic communication spaced apart from at least one injection well of the formation such that an inter-well treatment method is required to determine a geological property. In some embodiments, the tracer may be an inter-well tracer that is injected into an injection well and produced from a production well, where the injection well and the production well are different wells.

Figure 7A:
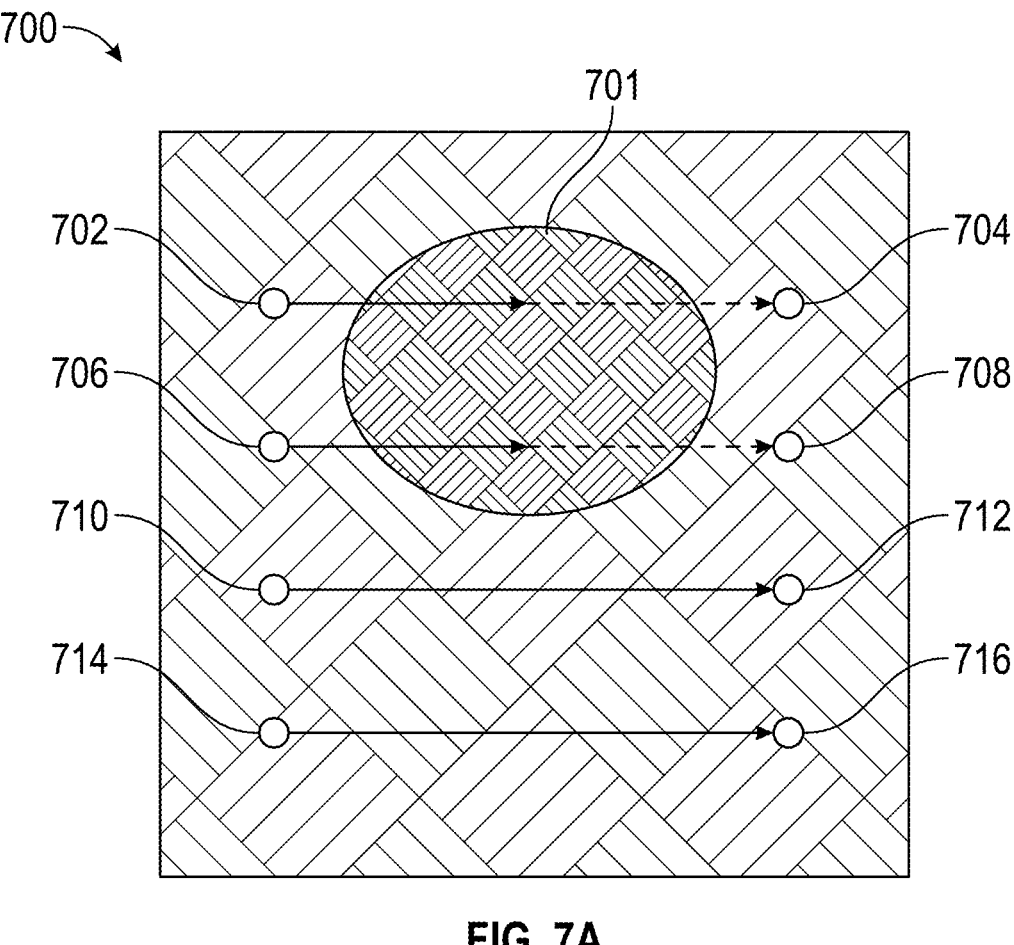
FIG. 7A is a non-limiting example of a formation with a plurality of inter-well sites in accordance with one or more embodiments.

FIG. 7A is a simplified and non-limiting example of a formation 700 with a plurality of inter-well sites in accordance with one or more embodiments. As shown in FIG. 7A, olivine minerals are present in a portion of the formation 700, such as in region 701. Injection sites (702, 706, 710, and 714) are each in fluid communication via formation pathways with respective production sites (704, 708, 712, and 716) provided in a different location of formation 700. In FIG. 7A, an original tracer solution (solid lines) configured for mineralogy-sensing transformation is injected to the formation via injection wells of injection sites 702, 706, 710, and 714 and traverses the subsurface formation via formation pathways (e.g., formation porosity pathways) to the respective production sites. The original tracer solution, a transformed tracer, or mixtures thereof can be recovered from production sites 704, 708, 712, and 716. Tracer solutions injected in sites 702 and 706 likely undergo transformation to produce a transformed tracer (dashed lines) due to the presence of olivine minerals in the formation. Tracer solutions injected in sites 710 and 714 likely do not undergo transformation as it traverses the formation to the production site due to the lack of reactive minerals.

Figure 7B:
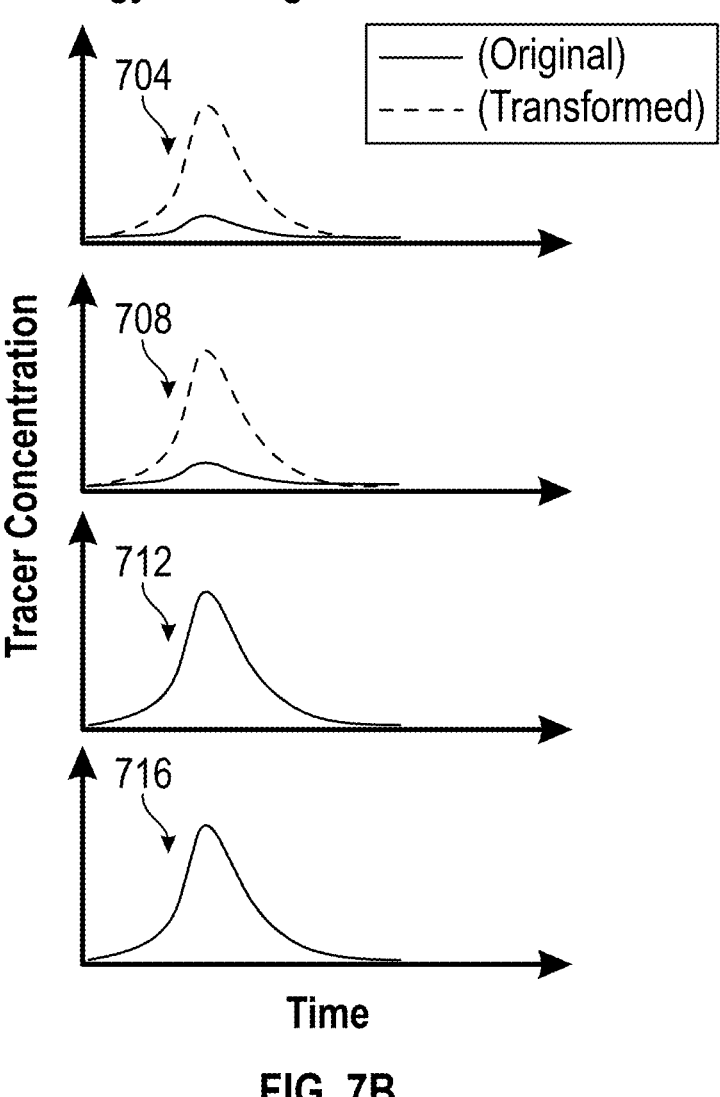
FIG. 7B is a graphical representation inter-well tracer breakthrough data for the production sites FIG. 7A in accordance with one or more embodiments.

FIG. 7B is a graphical representation inter-well tracer breakthrough data for the production sites FIG. 7A in accordance with one or more embodiments. The solid lines represent the original tracer solution detected at the production sites. The dashed lines represent the transformed tracers detected in the production sites. As noted above, fluid samples collected from production sites 712 and 716 do not indicate that a tracer was transformed or produced from the original tracer solution. In contrast, the fluid samples collected from production sites 704 and 708 can include relatively larger concentrations of transformed tracers as a result of the presence of olivine minerals in the formation between sites 702 and 704 and between sites 706 and 708.

Figure 8A:
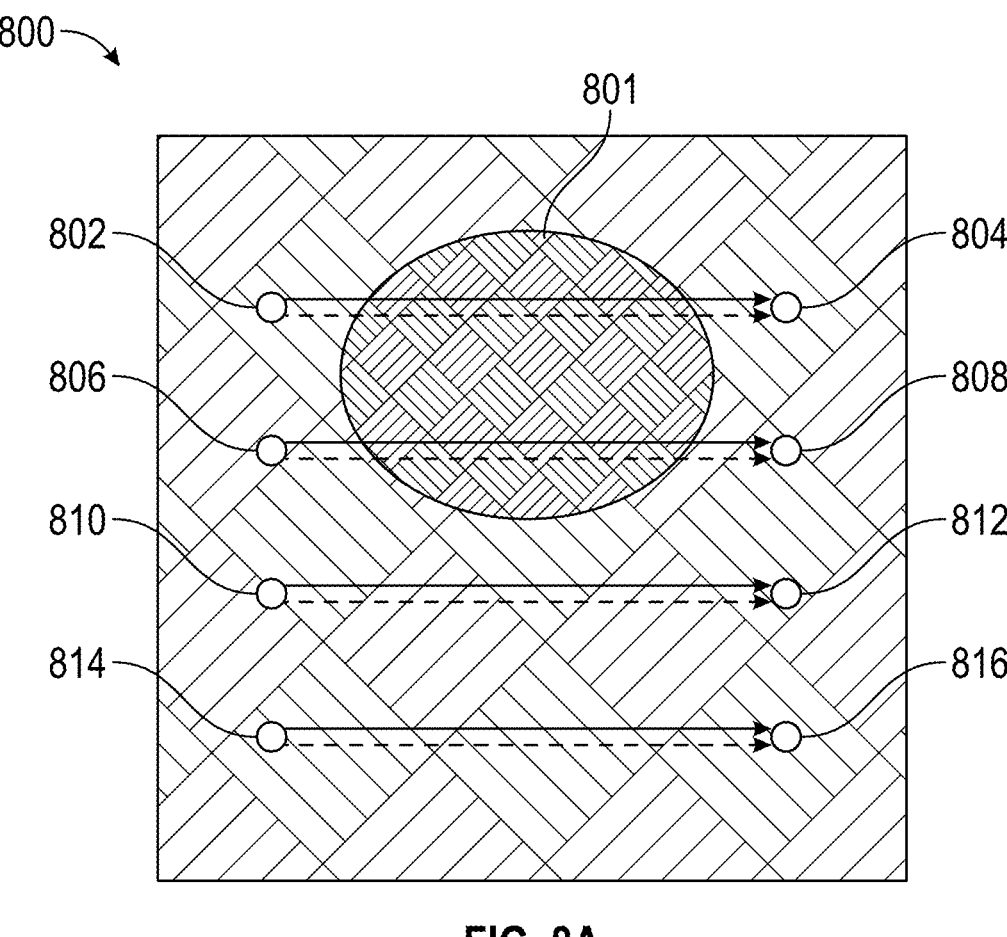
FIG. 8A is a simplified and non-limiting example of a formation with a plurality of inter-well sites in accordance with one or more embodiments.

FIG. 8A is a simplified and non-limiting example of a formation 800 with a plurality of inter-well sites in accordance with one or more embodiments. As shown in FIG. 8A, olivine minerals are present in a portion of the formation 800, such as in region 801. Injection sites (802, 806, 810, and 814) are each in fluid communication with respective production sites (804, 808, 812, and 816) provided in a different location of formation 800. In FIG. 8A, a tracer solution that includes a passive tracer and a mineralogy-sensing retentive tracer is injected to the formation via injection wells of injection sites 802, 806, 810, and 814 and traverses the subsurface formation to the respective production sites. The tracer solution including the passive tracer, the mineralogy-sensing retentive tracer, or mixtures thereof can be recovered in fluid samples from production sites 804, 808, 812, and 816. The mineralogy-sensing retentive tracer (dashed lines) of the tracer solution injected at sites 802 and 806 likely have a delayed breakthrough time as compared to the passive tracer (solid lines) due to the presence of olivine minerals that interact with and delay the production of the retentive tracer at production sites 804 and 808 of the formation. A retentive tracer injected in sites 810 and 814 likely do not experience a delay in breakthrough time as compared to a passive tracer as the formation lacks reactive minerals to interact with the retentive tracers.

Figure 8B:
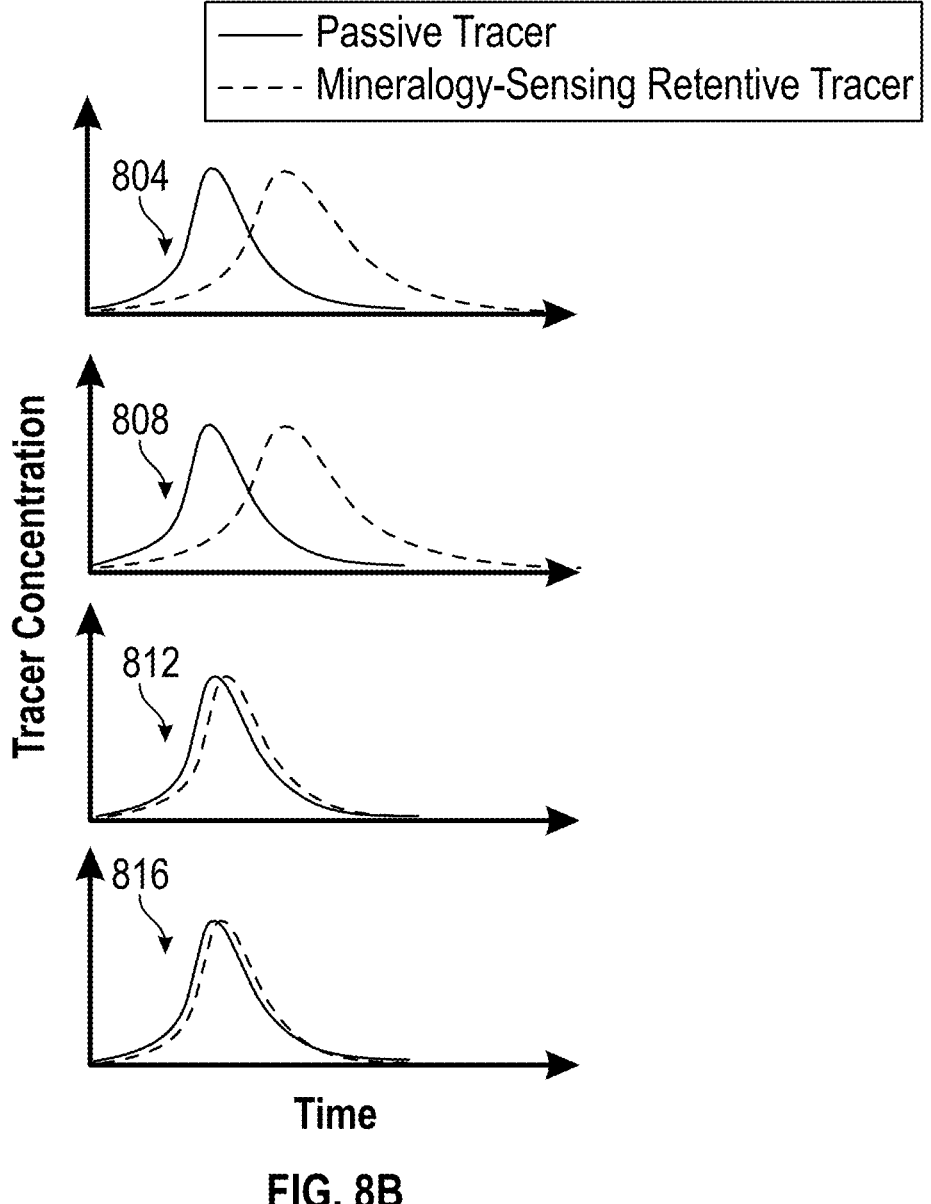
FIG. 8B is a graphical representation inter-well tracer breakthrough data for the production sites FIG. 8A in accordance with one or more embodiments.

FIG. 8B is a graphical representation inter-well tracer breakthrough data for the production sites FIG. 8A in accordance with one or more embodiments. The solid lines represent the passive tracer detected in fluid samples at the production sites. The dashed lines represent the mineralogy-sensing retentive tracers detected in fluid samples of the production sites. As noted above, fluid samples collected from production sites 812 and 816 do not display a delay in breakthrough times for either of the passive or retentive tracers produced from the formation. In contrast, the fluid samples collected from production sites 804 and 808 demonstrate a delay in breakthrough of the retentive tracer as compared to the passive tracer, which is a result of the presence of olivine minerals in the formation between sites 802 and 804 and between sites 806 and 808.

Figure 9A:
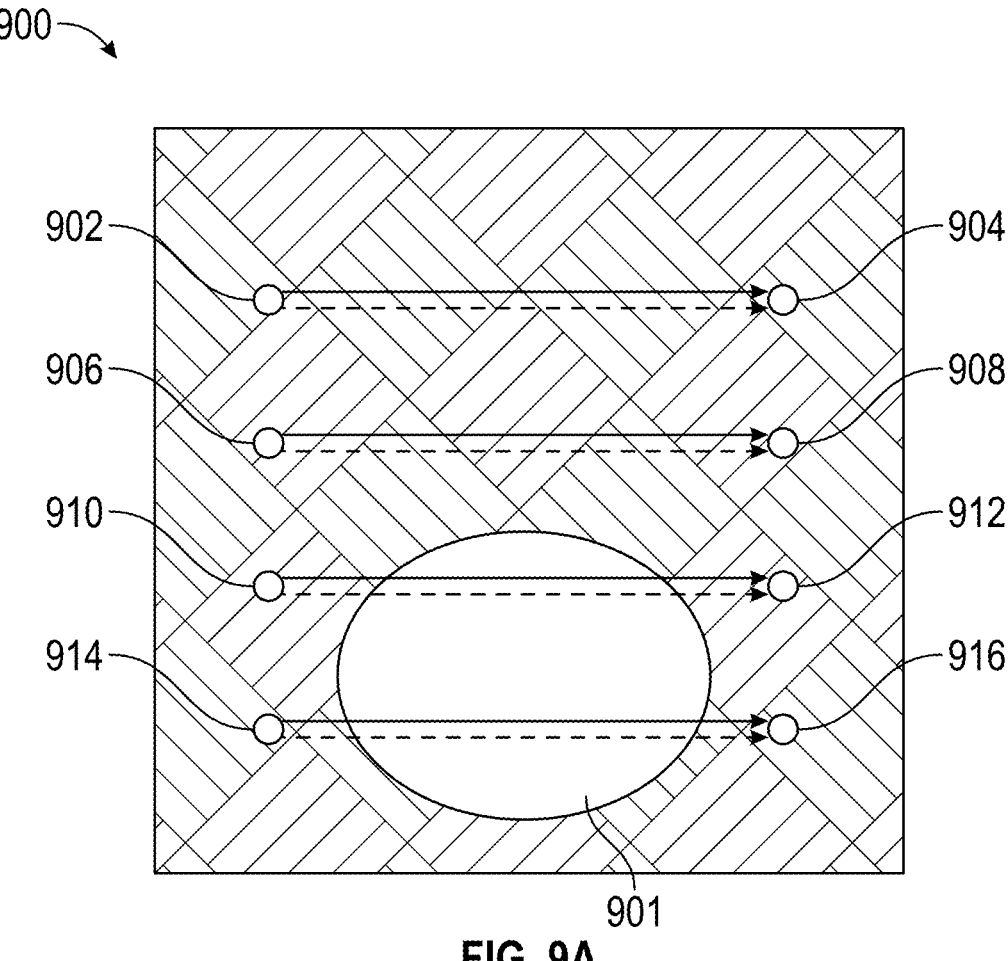
FIG. 9A is a simplified and non-limiting example of a formation with a plurality of inter-well sites in accordance with one or more embodiments.

FIG. 9A is a simplified and non-limiting example of a formation 900 with a plurality of inter-well sites in accordance with one or more embodiments. As shown in FIG. 9, an area with highly inaccessible pore volume is present in a portion of the formation 900, such as in region 901. Injection sites (902, 906, 910, and 914) are each in fluid communication with respective production sites (904, 908, 912, and 916) provided in a different location of formation 900. In FIG. 9A, a tracer solution that includes a passive tracer and a porosity-sensing tracer is injected to the formation via injection wells of injection sites 902, 906, 910, and 914 and traverses the subsurface formation to the respective production sites. The tracer solution including the passive tracer, the porosity sensing tracer, or mixtures thereof can be recovered in fluid samples from production sites 904, 908, 912, and 916. The porosity-sensing tracer (dashed lines) of the tracer solution injected at sites 910 and 914 likely have an accelerated breakthrough time as compared to the passive tracer (solid lines) due to the presence of highly inaccessible pore volume that prevents the ability of the porosity-sensing tracer to access the pores of the formation, resulting in an accelerated production of the porosity-sensing tracer in fluid samples at production sites 912 and 916. A porosity-sensing tracer injected in sites 902 and 906 likely do not experience an accelerated production breakthrough rate as compared to a passive tracer as the formation lacks areas with highly inaccessible pore volume.

Figure 9B:
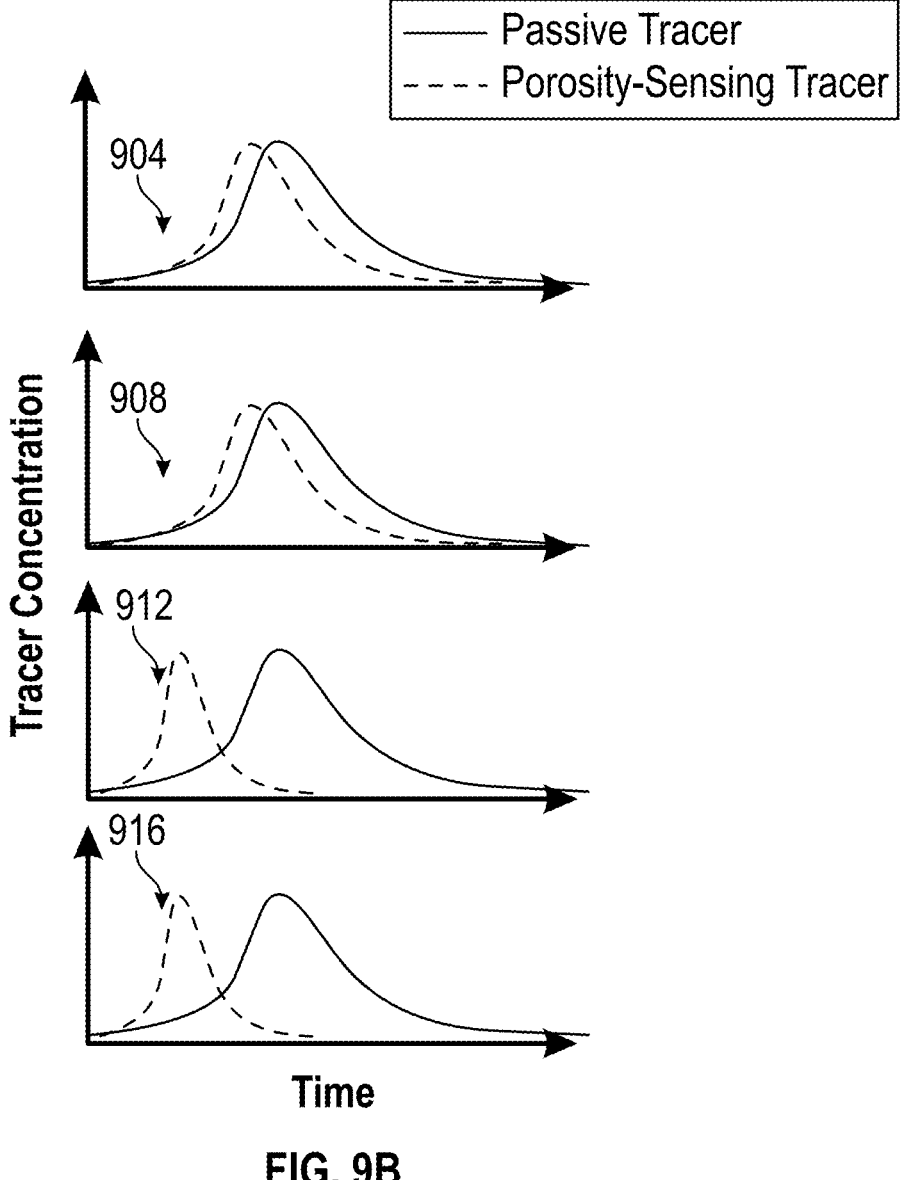
FIG. 9B is a graphical representation inter-well tracer breakthrough data for the production sites FIG. 9A in accordance with one or more embodiments.

FIG. 9B is a graphical representation inter-well tracer breakthrough data for the production sites FIG. 9A in accordance with one or more embodiments. The solid lines represent the passive tracer detected in fluid samples at the production sites. The dashed lines represent the porosity-sensing tracers detected in fluid samples of the production sites. As noted above, fluid samples collected from production sites 904 and 908 do not display an accelerated breakthrough rate for the porosity-sensing tracer produced from the formation as compared to the passive tracer. In contrast, the fluid samples collected from production sites 912 and 916 demonstrate an accelerated breakthrough rate for the porosity-sensing tracer as compared to the passive tracer, which is a result of the presence of highly inaccessible pore volume in the formation between sites 910 and 912 and between sites 914 and 916.

Referring back to method 400 of FIG. 4, block 406 includes collecting the tracer that has broken through to a production well. The tracer may be collected at a surface location of the formation. The collected fluid samples may be analyzed with a tracer detection system including one or more detection units as described above. Tracer data may be obtained from the analyzed fluid samples as shown in block 408. The tracer data may include one or more types of data selected from retention times of a tracer, concentration of a tracer, type of transformed tracer collected, differences in breakthrough times for a passive tracer as compared to a mineralogy-sensing retentive tracer and/or a porosity-sensing tracer, among other types of data that may be collected by the tracer detection system.

In block 410, a geological property of the formation may be determined from the obtained tracer data and a history matching algorithm. The determined geological property may include a minerology distribution, a porosity distribution, or both. The geological property may be determined by a computer system (e.g., computer system 300 of FIG. 3) at the surface of the formation or at an off-site location of the formation. For example, the computer system may generate an initial $CO_2$ geosequestration site model as shown in block 1002 of FIG. 10. The initial $CO_2$ geosequestration site model may be generated by generic geological software, designed by ad hoc guessing, or taken from existing site models, to determine the geological property. The one or more $CO_2$ geosequestration site models may include data selected from well porosities, minerology distributions, and other properties (e.g., well permeabilities). Geological software to generate site models include but are not limited to GSLIB (Geostatistical Software Library), Petrel (available from Schlumberger), Petra (available from S&P Global), geoSCOUT (available from geoLOGIC Systems), and ACCUMAP (available from S&P Global). In one or more embodiments, the $CO_2$ geosequestration site models, which can include one or more selected from well porosities, minerology distributions, and other properties (e.g., well permeabilities), are saved in a vector m.

In block 1004, a predictive simulation may be generated using the initial $CO_2$ geosequestration site model generated in block 1002 as a data input. The predictive simulation may predict passive tracer breakthrough, porosity-sensing tracer breakthrough, minerology-sensing tracer breakthrough data, or combinations thereof. Subsurface predictive simulations can include multiphase flow simulations, multicomponent reactive transport simulations or both. Subsurface predictive simulations can be generated using commercial or academic simulation software, such as UTCHEM, CMG, TOUGHREACT, COMSOL, among others. The predicted passive tracer breakthrough, predicted porosity-sensing tracer breakthrough, the mineralogy-sensing tracer breakthrough, or combinations thereof may be saved as data in a vector d. Measured tracer data collected from analyzed fluid samples obtained from field operations are saved in a vector $d_{obs}$. The measured tracer data may include measured data selected from one or more of passive tracer breakthrough data, porosity-sensing tracer breakthrough data, minerology-sensing tracer breakthrough data.

In block 1006, data assimilation may be performed by comparing the obtained tracer data measured from fluid samples taken from a production well with the predicted tracer breakthrough data saved in vector d to generate an improved $CO_2$ geosequestration site model. The ES-MDA- Tracer algorithm is then used to generate the improved $CO_2$ geosequestration site model $m^{l+1}$ with data saved in vectors m and d by implementing Equation (1) where:

$$m_j^{l+1} = m_j^l + C_{MD}^l \left(C_{DD}^l + \alpha_{l+1} C_D\right)^{-1} \left(d_{uc,j}^l - d_j^l\right), \qquad \text{Equation (1)}$$

where j=1, 2, . . . , $N_e$, with $N_e$ denoting the number of ensemble members. The term $C_{MD}^l$ refers to the cross-covariance matrix between the prior vector of initial $CO_2$ geosequestration site model parameters $m^l$ and the vector of predicted data $d^l$. The term $C_{DD}^l$ is the $N_d \times N_d$ auto-covariance matrix of predicted data with $N_d$ denoting the total number of measurements assimilated. A vector of perturbed observations is represented by $$d_{uc}^l$$

which is approximately $N(d_{obs}, \alpha_{l+1} C_D)$, and $C_D$ denotes a user defined $N_d \times N_d$ auto-covariance matrix of observed data measurement errors. Predefined inflation coefficients $\alpha_l$ and l satisfy the expression of $$\sum_{l=1}^{N_\alpha} \frac{1}{\alpha_l} = 1,$$

with $N_\alpha$ denoting the number of data assimilation iterations, and l=1,2 . . . . $N_\alpha$.

In some embodiments, $N_e$ can be set to a value in the range from 5 to 500. In some embodiments, $N_e$ can be set to a value in the range from 5 to 400. In some embodiments, $N_e$ can be set to a value in the range from 5 to 300. In some embodiments, $N_e$ can be set to a value in the range from 5 to 200. In some embodiments, $N_e$ can be set to a value in the range from 5 to 100. The number of ensemble members ($N_e$) can be set to a value in a range having a lower limit of any one of 5, 6, 7, 8, 9, 10, 15, 20, and 25 and an upper limit of any one of 95, 98, 99, 100, 102, 105, 150, 200, 210, 250, 290, 300, 310, 350, 390, 400, 410, 450, 490, 500, and 510, where any lower limit can be paired with any mathematically compatible upper limit. The number of ensemble members may depend upon the available geological information, geological complexity, computational efficiency, among other factors. The number of data assimilation iterations ($N_\alpha$) may be a value in the range from 1 to 12. In some embodiments, $N_\alpha$ can be a value in a range having a lower limit of any one of 1, 2, and 3, and an upper limit of any one of 8, 9, 10, 11, and 12, where any lower limit can be paired with any mathematically compatible upper limit.

In block 1008, the method includes determining if criteria for iteration termination have been met. In some embodiments, if the tracer data predicted from geological models (saved in vector d) match the real field observations (saved in vector $d_{obs}$), the criteria for termination has been met. In some embodiments, geological properties, such as porosity, permeability, mineral distribution, etc., are saved in vector m. In such embodiments, the properties stored in vector m continue updating by using Equation (1) until the stored properties can be used to predict tracer data $d_{obs}$. If the iteration criteria for termination have been met, the process is terminated. If the iteration criteria for termination have not been met, the process may repeat blocks 1004 and 1006 followed by reevaluation of criteria for termination. The process may be repeated until termination criteria have been met.

Referring back to FIG. 4, the method 400 includes block 412 of optimizing a $CO_2$ injection rate for $CO_2$ sequestration in the formation based on the determined geological property. $CO_2$ sequestration optimization may be performed by manually adjusting a $CO_2$ injection rate. Manual adjustment may include increasing injection rates to areas with relatively higher porosity for higher injectivity and storage volume as compared to areas with lower porosity, increasing injection rates to areas with relatively higher amounts $CO_2$-reactive minerals (e.g., olivine, serpentine, wollastonite, basalt, peridotite, dunite, among others) for faster $CO_2$ mineralization as compared to areas with lower amounts of $CO_2$-reactive minerals.

For example, FIGS. 11A-11B show $CO_2$ geosequestration injection schedules for a formation with two single well injection sites before (solid traces) and after (dashed traces) optimization in accordance with one or more embodiments. Before optimization, an equivalent amount of $CO_2$ is injected into each injection well. Through single well tracer studies, it may be discovered that there is a relatively high mineral distribution (e.g., a high olivine distribution) around a first injection site 1102 (e.g., 502 of FIGS. 5 and 602 of FIG. 6) as compared to a second site 1104 (e.g., 504 of FIGS. 5 and 604 of FIG. 6). Thus, a $CO_2$ injection rate to site 1102 may be increased and a $CO_2$ injection rate to site 1104 may be decreased as shown in shown in FIGS. 11A-11B to maximize $CO_2$ storage capacity and mineralization.

FIGS. 12A-12B show $CO_2$ geosequestration injection schedules of a formation with multiple inter well systems before (solid curves) and after (dashed curves) optimizations in accordance with one or more embodiments. Before optimization, $CO_2$ is injected into each injection site 1202, 1206, 1210, and 1214 in equal amounts. After injection of a tracer solution at each of the injection sites, it may be determined that a larger distribution of minerals (e.g., regions 701 and 801 of FIGS. 7 and 8, respectively) may be present in parts of the formation, an area of highly inaccessible pore volume (e.g. region 901 of FIG. 9) may be present, or both. As such, the $CO_2$ injection rate may be adjusted accordingly. For example, as shown in FIG. 12A, $CO_2$ injections into 1202 and 1206 may increase if a large distribution of minerals were determined to be present between the injection wells and production wells. The $CO_2$ injection rate for injection sites 1210 and 1214 of FIG. 12B may be decreased if mineral distribution was not observed in the formation. Thus, the method of one or more embodiments can maximize $CO_2$ storage capacity and mineralization.

In some embodiments, $CO_2$ sequestration optimization may be performed using an optimization algorithm. The optimization algorithm may be an ensemble-based optimization (EnOpt) algorithm. In such embodiments, the $CO_2$ sequestration optimization may be performed with one or more steps of a method 1300 of FIG. 13.

Figure 13:
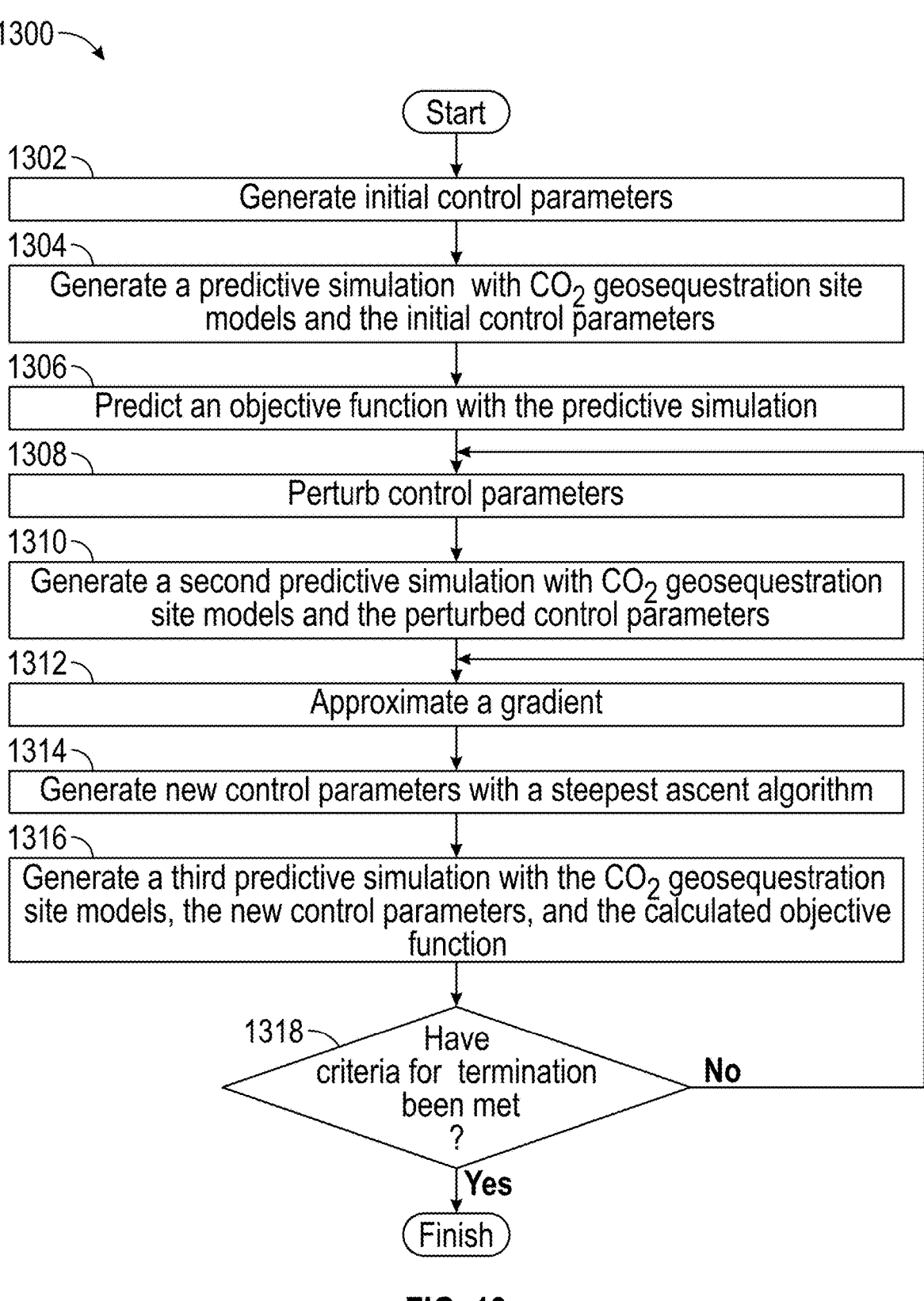
FIG. 13 is a method for optimizing $CO_2$ sequestration in accordance with one or more embodiments.

As shown in FIG. 13, method 1300 includes generating initial control parameters in block 1302. The control parameters can be the $CO_2$ injection rates as a function of time for each injection wells. Initial control parameters can be generated using ad hoc guessing and saved in vector u. In block 1304, the method includes initiating a predictive simulation using $CO_2$ geosequestration site models generated from block 1002 of FIG. 10 and stored in vector m and the initial control parameters stored in vector u. Subsurface predictive simulations can include multiphase flow simulations, multicomponent reactive transport simulations, or both. Subsurface predictive simulations can be generated using commercial or academic simulation software, such as UTCHEM, CMG, TOUGHREACT, COMSOL, among others. An objective function $J_j(u)$ defined as the total amount of sequestered $CO_2$, total amount of earned $CO_2$ storage credit, or both may be calculated and predicted from the simulation results as shown in block 1306.

In block 1308, the control parameters are perturbed. The perturbed control parameters $\hat{u}_j$ is approximately $N(u^l, C_U)$, where $j=1, 2, \ldots, N_e$ as the index for ensemble members, $N_e$ is the total number of ensemble members, iteration $l=0,1, \ldots, L$ until convergence, and $C_U$ is a predefined smoothing covariance matrix. In block 1310, a second predictive simulation may be generated with the $CO_2$ geosequestration site models generated from block 1002 and perturbed control parameters $\hat{u}_j$ from block 1308 as data inputs. A second objective function $J_j(\hat{u}_j)$ may be predicted from the second simulation results.

In block 1312, a gradient is calculated and approximated from Equation (2):

$$ g_l = \frac{1}{N_e} \sum_{j=1}^{N_e} \left( \hat{u}_j - u^l \right) \left[ J_j(\hat{u}_j) - J_j(u^l) \right]. $$

In block 1314, new control parameters ($u^{l+1}$) can be calculated and generated with a steepest ascent algorithm represented by Equation (3):

$$ u^{l+1} = u^l + \alpha_l \frac{C_U g_l}{\|C_U g_l\|_\infty}, \qquad \text{Equation (3)} $$

where $\alpha_l$ is a step size.

In block 1316, a third predictive simulation may be generated using $CO_2$ geosequestration site models generated in block 1002 of FIG. 10, new control parameters $u^{l+1}$, and the calculated objective function from block 1310. In block 1318, a determination is made if the criteria for termination have been met. If the criteria for termination have been met, the method of 1300 may be terminated. If the criteria for termination have not been met, control parameters may be perturbed again and blocks 1308 through 1316 may be repeated until termination criteria have been met. In some embodiments, if the criteria for termination have not been met, the gradient may be approximated again and blocks 1312 through 1316 repeated until termination criteria have been met.

For example, in each iteration l after calculating the approximate gradient $g_l$, an initial step size $\alpha_l$ equals the number of iterations l is used to calculate new control parameters $u^{l+1}$. If the new control parameters did not increase the value of objective function as compared to the originally calculated objective function, a is divided in half and the new control parameters $u^{l+1}$ is recalculated with this reduced step size. If after step size is reduced five times and the new control parameters still do not increase the value of the objective function, then a new set of perturbed control parameters are generated ($\hat{u}_j$) and used to calculate an updated gradient $g_l$. If an increase of objective function is not found after five successive resamplings of the perturbed control parameters, then the algorithm is terminated. The algorithm may be terminated if the relative increase in the value of the objective function is less than 0.0001

$$\left(\text{i.e., } \left|\frac{1}{N_e}\sum_{j=1}^{N_e} J_j\left(u^{l+1}\right) - \frac{1}{N_e}\sum_{j=1}^{N_e} J_j\left(u^l\right)\right| \middle/ \left|\frac{1}{N_e}\sum_{j=1}^{N_e} J_j\left(u^l\right)\right| \le 10\right)$$

$^{-4}$), and the $l_2$ norm of the relative change in the control vector is less than 0.001 (i.e., $\|u^{l+1}-u^l\|_2/\max(\|u^l\|_2, 1)\le 10^{-3}$). In some embodiments, the algorithm is terminated when $l=50$.

Embodiments of the present disclosure may provide at least one of the following advantages. One or more embodiments herein may overcome one or more mineralogical challenges of traditional $CO_2$ sequestration with the use responsive tracers to characterize subsurface $CO_2$ geosequestration sites. Embodiments herein may provide a detailed understanding of the mineralogy of potential $CO_2$ storage sites, develop advanced imaging and analytical techniques for characterizing the mineralogical composition of geological formations, or combinations thereof. One or more embodiments herein will assist in the identification of more highly suitable $CO_2$ storage sites and optimize the efficiency and safety of $CO_2$ sequestration.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for sequestering carbon dioxide ($CO_2$) in a formation, the method comprising:
   providing an injection well extending into the formation;
   injecting at least two tracers into the injection well to the formation, wherein the at least two tracers are selected from the group consisting of a passive tracer, a porosity-sensing tracer, a mineralogy-sensing tracer, and combinations thereof;
   collecting injected tracers at a surface of the formation;
   obtaining tracer data from the collected tracers;
   determining, by a computer system, a geological property with the obtained tracer data and a history matching algorithm;
   optimizing a $CO_2$ injection rate for $CO_2$ sequestration in the formation based on the determined geological property; and
   injecting $CO_2$ into the formation with the optimized $CO_2$ injection rate.

2. The method of claim 1, wherein the $CO_2$ injection rate is optimized by manual adjustment, wherein the manual adjustment comprises:
   increasing injection rates to areas in the formation with high $CO_2$-reactive minerals for faster $CO_2$ mineralization.

3. The method of claim 1, wherein the $CO_2$ injection rate is optimized by manual adjustment, wherein the manual adjustment comprises:
   increasing the $CO_2$ injection rate to areas in the formation with higher porosity to achieve higher injectivity and storage volume.

4. The method of claim 1, further comprising:
   holding the injected tracers in the injection well for a period of time prior to obtaining the tracer data; and
   returning the injected tracers through the injection well to collect the injected tracers at the surface.

5. The method of claim 1, further comprising:
   providing a production well extending into the formation, wherein the production well is spaced apart from the injection well;
   applying a pressure in the injection well to inject the tracers a distance into the formation; and
   monitoring tracer breakthrough in the production well prior to obtaining the tracer data.

6. The method of claim 1, further comprising:
   determining, by the computer system, the optimized $CO_2$ injection rate for $CO_2$ sequestration using an optimization algorithm and the determined geological property; and
   transmitting, by the computer system, the optimized $CO_2$ injection rate to control injection of $CO_2$ into the injection well.

7. The method of claim 6, further comprising:
   generating, by the computer system, initial control parameters;
   initiating, by the computer system, a predictive simulation with $CO_2$ geosequestration site models and the initial control parameters; and
   calculating, by the computer system, an objective function from the predictive simulation, wherein the objective function is the total amount of sequestered $CO_2$, a total amount of $CO_2$ storage capacity, or both.

8. The method of claim 7, further comprising:
   approximating, by the computer system, a gradient;
   generating, by the computer system, new control parameters with a steepest ascent algorithm;
   generating, by the computer system, the objective function with the predictive simulation, the $CO_2$ geosequestration site models, and the new control parameters; and
   determining, by the computer system, if termination criteria have been met.

9. The method of claim 1, further comprising:
   generating, by the computer system, an initial $CO_2$ geosequestration site model with geological software;
   initiating, by the computer system, a predictive simulation with a prior $CO_2$ geosequestration site model to predict tracer breakthrough data;
   comparing, by the computer system, the obtained tracer data with the predictive simulation to generate an improved $CO_2$ geosequestration site model; and
   determining, by the computer system, if criteria for iteration termination have been met.

10. The method of claim 1, wherein:
   the passive tracer does not interact with the formation,
   the porosity-sensing tracer is configured to characterize a subsurface formation porosity,
   the mineralogy-sensing tracer is configured to relate the distribution of one or more minerals of a subsurface formation, and
   the mineralogy-sensing tracer comprises one or more selected from a mineralogy-sensing transformative tracer, a mineralogy-sensing retentive tracer, and combinations thereof.

11. The method of claim 1, wherein the passive tracer is one or more selected from the group consisting of dipicolinic acid (DPA), 4,7-bis(sulfonatophenyl)-1,10-phenanthroline-2,9-dicarboxylic acid (BSPPDA), 2-fluorobenzoic acid, 3-fluorobenzoic acid, 4-fluorobenzoic acid, 2,3-difluorobenzoic acid, 2,4-difluorobenzoic acid, 2,5-difluorobenzoic acid, 3,4-difluorobenzoic acid, sodium thiocyanate (NaSCN), sodium bromide (NaBr), and combinations thereof.

12. The method of claim 1, wherein the porosity-sensing tracer is selected from the group consisting of as poly (1-vinyl imidazole-co-4-trifluoromethylstyrene), poly(3-(1-vinyl-1H-imidazol-3-ium-3-yl)propane-1-sulfonate-co-4-trifluoromethylstyrene), poly (3-(1-vinyl -1H-imidazol-3-ium-3-yl)propane-1-sulfonate), and combinations thereof.

13. The method of claim 1, wherein the mineralogy-sensing tracer is selected from the group consisting of clarithromycin, roxithromycin, pulses of fresh water, pulses of acid, Mg, Ca, Si, Cr, Ni, Cu, methane, hydrogen, potassium acid phthalate, ascorbic acid, imidazole, 2-methylimidazole, 2-methylpyridine, and 3-methylpyridine, and combinations thereof.

14. A method for determining a geological property of a formation, the method comprising:

injecting at least two tracers into the injection well to the formation, wherein the at least two tracers are selected from the group consisting of a passive tracer, a porosity-sensing tracer, a mineralogy-sensing tracer, and combinations thereof;

collecting injected tracers at a surface of the formation;

obtaining tracer data from the collected injected tracers; and determining, by a computer system, the geological property with the obtained tracer data and a history matching algorithm.

15. The method of claim 14, further comprising optimizing carbon dioxide ($CO_2$) sequestration based on a determined mineralogy distribution of the formation.

* * * * *